(12) United States Patent
Bell et al.

(10) Patent No.: US 10,273,610 B2
(45) Date of Patent: Apr. 30, 2019

(54) FIBRE MATRIX AND A METHOD OF MAKING A FIBRE MATRIX

(71) Applicant: CARBON FIBRE PREFORMS LTD, Henley-in-Arden, Warwickshire (GB)

(72) Inventors: David Bell, Carlisle (GB); Roy George Price, Henley-in-Arden (GB)

(73) Assignee: CFP COMPOSITES LIMITED, Henley-in-Arden (GB)

( * ) Notice: Subject to any disclaimer, the term of this patent is extended or adjusted under 35 U.S.C. 154(b) by 337 days.

(21) Appl. No.: 14/047,731

(22) Filed: Oct. 7, 2013

(65) Prior Publication Data

US 2014/0037878 A1 Feb. 6, 2014

Related U.S. Application Data

(62) Division of application No. 13/384,487, filed as application No. PCT/GB2010/051171 on Jul. 19, 2010, now Pat. No. 8,580,169.

(30) Foreign Application Priority Data

Jul. 17, 2009 (GB) .................................. 0912455.3
Jun. 29, 2010 (GB) .................................. 1010901.5

(51) Int. Cl.
*D04H 1/64* (2012.01)
*B01J 6/00* (2006.01)
(Continued)

(52) U.S. Cl.
CPC ................ *D04H 1/64* (2013.01); *B01J 6/008* (2013.01); *B29B 11/16* (2013.01); *B29C 41/02* (2013.01);
(Continued)

(58) Field of Classification Search
CPC .............. B29C 41/02; C04B 2235/422; C04B 2235/5248; C04B 2235/5268;
(Continued)

(56) References Cited

U.S. PATENT DOCUMENTS 3,353,981 A * 11/1967 Jacob .................... B29C 70/025
264/41
4,041,116 A 8/1977 Baud et al.
(Continued)

FOREIGN PATENT DOCUMENTS

CN 1598142 A 3/2005
CN 1318697 C 5/2007
(Continued)

OTHER PUBLICATIONS

B Gryzb, J Machnikowski, J Weber: Mechanism of Co-pyrolysis of Coal Tar pitch with Polyvinyl pyridine. Published in the Journal of Analytical Applied Pyrolysis vol. 67 issue 1 pp. 77-93 Mar. 2003 and available at www.sciencedirect.com.
(Continued)

*Primary Examiner* — Camie S Thompson
(74) *Attorney, Agent, or Firm* — Arent Fox LLP

(57) ABSTRACT

A method of forming a three dimensional fiber structure is disclosed which comprises the steps of a) providing a starting material which comprises liquid carrier, fibers and binder; b) passing the starting material over a substrate so as to deposit fibers onto the substrate; c) forming a three dimensional fiber matrix; and d) curing the binder. The flow of material onto the substrate may be controlled such that the flow of a starting material over the substrate is chaotic and fibers are laid down in a three dimensional structure containing a high proportion of voids. The preform may be pressurized while moist and is cured under pressure. The fibers may comprise carbon fibers; recycled carbon fiber has (Continued)

Figure 1:
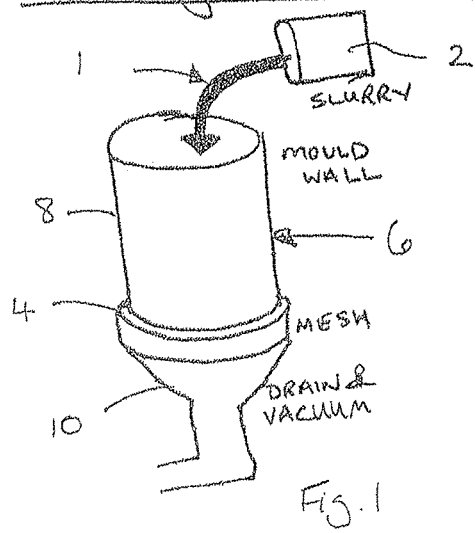

been found to be particularly useful. The resulting preform may be stochastic and is suitable for use in ablative and braking applications.

24 Claims, 2 Drawing Sheets

(51) Int. Cl.

| | |
|---|---|
| *B29C 41/02* | (2006.01) |
| *F16D 69/02* | (2006.01) |
| *C04B 35/622* | (2006.01) |
| *C04B 35/626* | (2006.01) |
| *C04B 35/63* | (2006.01) |
| *C04B 35/634* | (2006.01) |
| *C04B 35/80* | (2006.01) |
| *C04B 35/83* | (2006.01) |
| *D21H 13/50* | (2006.01) |
| *F41H 5/04* | (2006.01) |
| *B29B 11/16* | (2006.01) |
| *B33Y 70/00* | (2015.01) |
| *B33Y 10/00* | (2015.01) |

(52) U.S. Cl.
CPC ...... *C04B 35/6263* (2013.01); *C04B 35/6269* (2013.01); *C04B 35/62204* (2013.01); *C04B 35/62685* (2013.01); *C04B 35/6316* (2013.01); *C04B 35/6346* (2013.01); *C04B 35/63416* (2013.01); *C04B 35/63424* (2013.01); *C04B 35/63436* (2013.01); *C04B 35/63444* (2013.01); *C04B 35/63452* (2013.01); *C04B 35/63456* (2013.01); *C04B 35/63488* (2013.01); *C04B 35/803* (2013.01); *C04B 35/83* (2013.01); *D21H 13/50* (2013.01); *F16D 69/023* (2013.01); *F16D 69/026* (2013.01); *F41H 5/0471* (2013.01); *F41H 5/0485* (2013.01); *B33Y 10/00* (2014.12); *B33Y 70/00* (2014.12); *C04B 2235/3418* (2013.01); *C04B 2235/422* (2013.01); *C04B 2235/5248* (2013.01); *C04B 2235/5264* (2013.01); *C04B 2235/5268* (2013.01); *C04B 2235/5272* (2013.01); *C04B 2235/5436* (2013.01); *C04B 2235/604* (2013.01); *C04B 2235/608* (2013.01); *C04B 2235/614* (2013.01); *C04B 2235/95* (2013.01); *Y10T 428/1362* (2015.01); *Y10T 428/24994* (2015.04); *Y10T 442/60* (2015.04)

(58) Field of Classification Search
CPC ............ C04B 35/6263; C04B 35/6269; C04B 35/6346; C04B 35/83; C04B 2235/5272; C04B 2235/3418; C04B 2235/5264; C04B 2235/5436; C04B 2235/604; C04B 2235/608; C04B 2235/614; C04B 2235/95; C04B 35/803; C04B 35/62204; C04B 35/6316; C04B 35/63416; C04B 35/63444; C04B 35/63424; C04B 35/63452; C04B 35/63456; C04B 35/63488; F16D 69/023; F16D 69/026; F16D 13/50; F16D 69/02; Y10T 442/60; Y10T 428/24994; Y10T 428/1362; B29B 11/16; B33Y 10/00; D21H 13/50; D04H 1/64; B01J 6/008; B01J 6/00; F41H 5/0471; F41H 5/0485
USPC .......... 442/327; 428/36.1; 264/109
See application file for complete search history.

(56) References Cited

U.S. PATENT DOCUMENTS

| | | | |
|---|---|---|---|
| 4,532,091 A | 7/1985 | Dias et al. | |
| 4,656,203 A | 4/1987 | Parker | |
| 4,765,915 A | 8/1988 | Diehl | |
| 4,775,705 A | 10/1988 | Parker et al. | |
| 4,818,448 A | 4/1989 | Wrenn, Jr. et al. | |
| 4,836,875 A | 6/1989 | Buttermore et al. | |
| 5,045,356 A * | 9/1991 | Uemura | C04B 35/83 427/113 |
| 5,089,088 A | 2/1992 | Hendren et al. | |
| 5,120,211 A | 6/1992 | Ito et al. | |
| 5,143,184 A | 9/1992 | Snyder et al. | |
| 5,190,991 A | 3/1993 | Parker et al. | |
| 5,283,113 A | 2/1994 | Nishimura et al. | |
| 5,294,391 A * | 3/1994 | McMillin | A61F 2/30965 156/148 |
| 5,376,326 A | 12/1994 | Medney et al. | |
| 5,599,603 A | 2/1997 | Evans et al. | |
| 5,705,008 A | 1/1998 | Hecht | |
| 5,744,075 A * | 4/1998 | Klett | C04B 35/83 264/122 |
| 5,803,210 A | 9/1998 | Kohno et al. | |
| 5,871,844 A | 2/1999 | Theys et al. | |
| 5,972,253 A | 10/1999 | Kimber | |
| 6,190,151 B1 | 2/2001 | Hunt | |
| 6,258,300 B1 | 7/2001 | Burchell et al. | |
| 6,361,722 B1 | 3/2002 | Theys et al. | |
| 6,361,733 B1 | 3/2002 | Eicher et al. | |
| 6,524,438 B2 | 4/2003 | Matsumoto | |
| 7,153,543 B2 | 12/2006 | Johnson | |
| 7,413,701 B2 | 8/2008 | Kienzle et al. | |
| 7,438,839 B2 | 10/2008 | Simpson et al. | |
| 7,678,307 B1 | 3/2010 | Geiger | |
| 7,682,697 B2 * | 3/2010 | Raghavendran | B32B 5/02 156/62.4 |
| 2002/0190439 A1 | 12/2002 | Nelson et al. | |
| 2003/0041524 A1 | 3/2003 | Gardner et al. | |
| 2003/0051839 A1 | 3/2003 | Matsumoto | |
| 2003/0121631 A1 | 7/2003 | Dinwoodie et al. | |
| 2003/0162647 A1* | 8/2003 | Muhlratzer | B82Y 30/00 501/95.2 |
| 2003/0166744 A1 | 9/2003 | Van Dijk et al. | |
| 2004/0059010 A1* | 3/2004 | Nutt | B29C 70/025 521/56 |
| 2005/0138891 A1 | 6/2005 | Wool et al. | |
| 2005/0202268 A1 | 9/2005 | Kotter et al. | |
| 2005/0221011 A1 | 10/2005 | Eichner et al. | |
| 2005/0248067 A1 | 11/2005 | Geiger, Jr. | |
| 2005/0266203 A1 | 12/2005 | La Forest et al. | |
| 2006/0027792 A1 | 2/2006 | Butcher et al. | |
| 2006/0130993 A1 | 6/2006 | Blanton et al. | |
| 2006/0177663 A1 | 8/2006 | Simpson et al. | |
| 2007/0023975 A1 | 2/2007 | Buckley | |
| 2007/0132126 A1 | 6/2007 | Shao et al. | |
| 2007/0262200 A1 | 11/2007 | Waghray et al. | |
| 2007/0267604 A1 | 11/2007 | Butcher et al. | |
| 2007/0269644 A1 | 11/2007 | Harper et al. | |
| 2008/0070019 A1 | 3/2008 | Good et al. | |
| 2008/0090064 A1 | 4/2008 | James et al. | |
| 2008/0305701 A1 | 12/2008 | Guigner et al. | |
| 2009/0039566 A1 | 2/2009 | Rodman | |
| 2009/0061085 A1 | 3/2009 | Waghray et al. | |
| 2009/0069169 A1 | 3/2009 | Bauer | |
| 2009/0078514 A1 | 3/2009 | Baud et al. | |
| 2009/0292057 A1 | 11/2009 | Handa et al. | |
| 2010/0065389 A1* | 3/2010 | Gilboy | F16D 65/092 188/251 R |
| 2010/0122769 A1 | 5/2010 | Levit | |
| 2010/0124650 A1 | 5/2010 | Gieger | |

FOREIGN PATENT DOCUMENTS

| | | |
|---|---|---|
| DE | 36 15 292 A1 | 11/1987 |
| DE | 40 39 450 A1 | 6/1992 |
| DE | 10258935 | 7/2004 |

(56) References Cited

FOREIGN PATENT DOCUMENTS

| | | |
|---|---|---|
| DE | 10 2004 016 646 A1 | 10/2005 |
| DE | 10 2007 024 045 A1 | 8/2008 |
| EP | 0 330 181 A2 | 8/1989 |
| EP | 0 402 915 A2 | 12/1990 |
| EP | 0695730 | 2/1996 |
| EP | 0 883 736 A1 | 12/1998 |
| EP | 1 098 104 A2 | 5/2001 |
| EP | 1428649 | 6/2004 |
| EP | 1 813 833 A1 | 8/2007 |
| GB | 1 232 007 A | 5/1971 |
| GB | 1 389 498 A | 4/1975 |
| GB | 2 012 671 A | 8/1979 |
| GB | 2041031 A | 9/1980 |
| GB | 2 137 974 A | 10/1984 |
| GB | 2 312 446 A | 10/1997 |
| JP | 54-050613 A | 4/1979 |
| JP | S60-231034 A | 11/1985 |
| JP | 63111039 | 5/1988 |
| JP | H11-505205 A | 5/1999 |
| JP | 2002-097082 A | 4/2002 |
| JP | 2007-307900 A | 11/2007 |
| JP | 2008-297656 A | 12/2008 |
| WO | WO 92/004492 A1 | 3/1992 |
| WO | WO 97/32118 A1 | 9/1997 |
| WO | WO 98/04404 A1 | 2/1998 |
| WO | WO 00/71329 | 11/2000 |
| WO | WO 2005/116476 A2 | 12/2005 |
| WO | WO 2006/127002 A1 | 11/2006 |
| WO | WO 2007/049591 A1 | 5/2007 |
| WO | WO 2008/060684 A2 | 5/2008 |

OTHER PUBLICATIONS

Blacewicz, S et al; Carbon-Carbon Composites Made of High Modulus Graphite Fibres; Extract found on the web and available from acs.omnibooksonline.com and published in 1995.
Blazenov et al; Compression fracture of Unidirectional Carbon fibre-reinforced plastics; Journal of materials Science 26 (1991) 6764-6776.
Boyer et al—Nonwoven Carbon Fiber Composites. Presentation at TAPPI 1990 conference and available at www.tappi.org.
Bradley, Bowen, McEnaaney & Johnson—Shear Properties of a carbon Carbon Composite with Non Woven Felt and Continuous Fibre reinforcement Layers Published in 'Carbon' vol. 45, issue 11 pp. 2178-2187. Available via the university of Bath on www.chemweb.com.
Burchell T et al—The Structure and Properties of Carbon Fiber based Absorbent Monoliths Published Nov. 6, 1998 by Oak Ridge National Laboratory, PO Box 2008, Oak Ridge TN37831-6088. Available at www.osti.org (Office of Scientific and Technical Information).
Cordell T, Tolle T B, Rondeau R—The Programmable Powdered Preform Process for Aerospace; Affordable Performance through Composites. Presentation at SAMPE International Symposium in May 2000. Document is based on results from US Air Force contract No. F33615-97-C-5005. Document dated Jan. 10, 2002 and available as pdf at www.compositecenter.org.
Egon Wiberg, Nils Wiberg, Arnold Frederick Holleman—Inorganic Chemistry p. 783. Published for Holeman and Wiberg by Academic Press, 525B Street, Suite 1900, San Diego, California. International standard book No. 0-12-35265-1. Available on line at google books.
Endruweit et al: The permeability of random discontinuous carbon fibre performs by A Endruweit, L.T. Harper, T.A. Turner, N.A. from Polymer Composite vol. 31 issue 4 pp. 569-580 and available at www.onlinelibrary.wiley.com dated Mar. 23, 2009.
EPO Communication issued in counterpart application 10799121.8, dated Jun. 7, 2013
Ewins P D; A compressive Test Specimen for the Unidirectional Carbon fibre Reinforced Plastic; Ministry of Technology Aeronautical Research Council Current Papers, CP No. 1132, (Published 1970).
Glogar P et al: Influence of Matrix Densification upon Structure and Elastic properties of Carbon-Carbon composite shells; Ceramics—Silikaty 44(2) 54-59(2000).
Janney et al—Fabrication of Chopped Fibre Preforms by the 3 DEP process—Composites and Polycon 2007 Oct. 17-19 2007, pp. 1-8.
Klett J et al—Carbon Fiber Carbon Composites for Catalyst Supports Proceedings of the 22nd Biennial Conference on Carbon, Pergamon Press, University of California, San Diego, CA, Jul. 16-21, 1995.
Klett J et al—Slurry Moulding of Carbon-Carbon composites and their Applications Published 4th International Conference on Composites Engineering, Kona, HI, Jul. 6-12, 1997.
Klucakova M—Efficiency of Densification on Preparation of carbon-carbon composites. Published by International Journal of Physical Sciences vol. 1 (3) pp. 121-125 in Nov. 2006.
Manocha L M; High Performance carbon-carbon composites; Sadhana vol. 28, Parts 1 & 2 Feb./Apr. 2003, pp. 349-358.
N Baitcher et al—SBIR Phase I Report—Dated 2007.
Nairn J A et al; Effects of Fiber, Matrix and Interphase on Carbon fiber Composite Compression Strength; NASA Contractor Report 4601 May 1994.
Peter Morgan "Carbon fibres and their Composites" Published 2005, p. 363, 791, 833-834.
Piat R et al; Material Modelling of the CVI-infiltrated carbon felt II. Statistical study of the microstructure, numerical analysis and experimental validation. Composites Science and Technology 66(2006), 2769-2775.
Rohini Devi G and Rama Rao K; Carbon-Carbon Composites—An Overview; Defence Science Journal, vol. 43 No. 4 Oct. 1993, pp. 369-383.
Ruiying Lao, Quiang Li—Brake characteristics of 2D Carbon/Carbon Composites prepared by Rapid Diffused CVI Technology. Published in Science and Engineering Materials Aug. 15, 2004, vol. 379 issue 1-2, pp. 33-38 and available at www.sciencedirect.com.
SBER Final report Phase II Low Cost carbon Fibre Composites for Lightweight Vehicle Parts. SBIR report date May 14, 2007 and published by Materials Innovation Technologies LLC.
Seung Hwan Lee; Residual Compressive failure characteristics on Hybrid Composites with Non Woven Carbon Tissue after indentation Damage; Journal of Composite Materials, vol. 38, No. 17, 1461-1477(2004).
Tiesong Lin et al; Effects of fibre content on mechanical properties and fracture behaviour of short carbon fibre reinforced geopolymer matrix composites. Bull Mater Sci, vol. 32 No. 1 Feb. 2009, pp. 77-81.
Williams G et al; A self healing Carbon fibre reinforced polymer. Composites Part A (2007) doi: 10.1016/j.composites 2007.01.013, Published 2007.
Zhang W G et al; Inside-Outside Densification of Carbon Fiber Preforms by Isothermal, Isobaric CVI. Available at www.electrochem.org and published Feb. 25, 2003 by the Institut for Chemie Technik, Universitat Karlsruhe, Germany.
Japanese Office Action of Japanese Patent Application No. 2012-520102 dated Apr. 8, 2014.
Japanese Office Action of Japanese Patent Application No. 2012-520102 dated Aug. 18, 2015.
Japanese Office Action of Japanese Patent Application No. 2012-520102 dated Jan. 13, 2015.

* cited by examiner

FIBRE MATRIX AND A METHOD OF MAKING A FIBRE MATRIX

CROSS-REFERENCE TO RELATED APPLICATIONS

This is a divisional application which claims the benefit of U.S. patent application Ser. No. 13/384,487, filed Mar. 2, 2012, which is a National Stage entry of International Application No. PCT/GB2010/051171, filed Jul. 19, 2010, which claims priority to Great Britain Application No. 0912455.3, filed Jul. 17, 2009 and Great Britain Application No. 1010901.5, filed Jun. 29, 2010. The disclosures of the prior applications are incorporated in their entirety by reference.

This invention relates a fibre based preform and to a method of making a fibre matrix for such a preform. The preform is suitable for use in ablative, high performance, friction, wear and corrosion resistant applications. In particular, the invention relates to a method of producing a carbon based matrix for use in high temperature applications such as brakes, rocket motor housings and the like.

It is well known to manufacture preforms for use in carbon-carbon composite applications. Morgan in "Carbon Fibres and their Composites" details preforms and methods of producing such preforms as precursors in the production of carbon composites.

It is also known to manufacture fibre based preforms from other fibres such as silicon carbide, PPS fibres, PEEK fibres or ceramic oxide fibres. Such composites are commonly used in braking applications after having been subjected to pyrolysis. One form of pyrolysis process is chemical vapour deposition by hydrocarbons and gas. Such a process is commonly termed CVD. An alternative pyrolysis process is infusion by thermosetting resin or liquid impregnation by pitch or liquid silicone materials. Such processes are commonly referred to as the CVI processes.

It is known to use non woven, unidirectional, 2D, and 3D pre-pregs (pre-impregnated composite fibres) of chopped and fibre tows. These materials have been used as a basis for higher temperature infusion processes.

Carbon-carbon composites for use in high temperature applications desirably have a high volume of fibres in the final structure. Non-woven materials have to be subjected to intensive heat treatments and often shrink during the carbonisation process. In addition, it is well known that such materials have a low fibre volume fraction unless they are compressed. Furthermore it is well known in the art that carbon fibre has a friable nature and that overuse of compression forces will result in significant breakage of carbon fibre within a body of the preform. Some composites have been compressed but the total carbon content has been small and the carbon used has been nano-particles.

Woven pre-pregs can be used to improve the fibre volume fraction of a preform. Woven pre-pregs can be used in layers which each have a finite thickness and basis weight and a number of layers can be bonded together to form the final preform. In each layer x/y alignment of the fibre construction promotes film forming at low rotational speeds and thus reduces low temperature shear wear in braking applications. However, it is desirable to have "z" directional fibres, i.e. through the plane orientation of the fibre, to ensure that an internal structure of the pre-formed body will not suffer a catastrophic shear failure at an interface of adjacent layers. Typically, this problem has been resolved by either needling or stitching. Such processes are taught in U.S. Pat. No. 5,143,184 and U.S. Pat. No. 5,599,603.

Needling and stitching can also be used to improve the final volume fraction of the preform substrate in the case of non woven materials. In U.S. Pat. No. 5,599,603 non woven fabrics are stitched or needled to the desired thickness.

The desirability of needling is set out for example in U.S. Pat. No. 6,361,722, U.S. Pat. No. 5,803,210 and EP 1 813 833. It is generally accepted that needling is required in order to obtain a preform having a sufficiently high fibre volume fraction. The final volume fraction is considered to be a limiting factor when considering the use of a fabric in a final pre-preg. If the fibre volume fraction is insufficiently high prior to densification, the material may be suitable for less demanding ablative applications but low fibre volume fractions can prohibit the use of the preform in high wear applications such as performance brake applications.

A higher body volume fraction of fibre can be obtained using woven materials but careful handling and attention to detail in the construction process is required by the use of multiple layers and construction of the preform prior to densification since it is necessary to ensure that multiple layers are lined in specific geometrical sequences since the orientation of the fibres in each layer must be altered to remove the possibility of a catastrophic through plane fracture. The presence of multiple layers necessitates the use of needling or stitching as detailed in US 2008/0090064. Consequently it may take a considerable period of time, such as several weeks, to produce the preform.

It is known to manufacture preforms from a slurry containing carbon fibres and a binder as set out in "Structure and Properties of Carbon Fibre based absorbent Monoliths" by Burchell, Judkins, Roger and Shaw and in SBIR Phase 1 Final Report by Materials Innovation Materials LLC. In known methods it is necessary to provide agitation of the slurry and a mould having a porous former is lowered into the slurry, and then lifted out of the slurry mixture. Fibres settle onto the porous former. Water or other solvent can be removed from the former by applying a vacuum. Alternatively, slurry material from a tank has been allowed to flow downward to a porous former and a vacuum has in some methods been applied to the porous former to draw the solvent through the former and leave the carbon fibres in the mould.

SUMMARY OF THE INVENTION

According to a first aspect of the invention there is provided a method of making a fibre matrix, the method comprising:
   a. providing a starting material which comprises liquid carrier, fibres and binder;
   b. passing the starting material over a substrate so as to deposit fibres onto the substrate;
   c. forming a three dimensional fibre matrix; and
   d. curing the binder.

Preferably the three dimensional matrix is formed by at least one of:
   i) applying a vacuum force to the fibres on the substrate;
   ii) creating a chaotic flow of starting material over the substrate.

Accordingly, in one option for the first aspect the method comprises:
   a. providing a starting material which comprises liquid carrier, fibres and binder;
   b. passing the starting material over a substrate so as to deposit fibres onto the substrate;
   c. applying a vacuum force to the fibres on the substrate, forming a three dimensional fibre matrix; and
   d. curing the binder.

In a second option for the first aspect the method comprises
  a. providing a starting material which comprises liquid carrier, fibres and binder;
  b. passing the starting material over a substrate so as to deposit fibres onto the substrate;
  c. creating a chaotic flow of starting material over the substrate, forming a three dimensional fibre matrix; and
  d. curing the binder.

In one embodiment both i) applying a vacuum force to the fibres on the substrate and ii) creating a chaotic flow of starting material over the substrate may be used to form the three dimensional matrix.

According to a preferred first aspect of the invention there is provided a method of making a fibre matrix, the method comprising:
  a. providing a starting material which comprises liquid carrier, fibres and binder, and providing a substrate in a mould;
  b. controlling a flow of starting material into the mould and passing the starting material over the substrate in the mould so as to deposit fibres onto the substrate;
  c. forming a three dimensional fibre matrix; and
  d. curing the binder.

Preferably in the preferred first aspect the three dimensional matrix is formed by at least one of:
  i) applying a vacuum force to the fibres on the substrate;
  ii) creating a chaotic flow of starting material over the substrate.

Accordingly, in one option for the preferred first aspect the method comprises:
  a. providing a starting material which comprises liquid carrier, fibres and binder, and providing a substrate in a mould;
  b. controlling a flow of starting material into the mould and passing the starting material over a substrate so as to deposit fibres onto the substrate;
  c. applying a vacuum force to the fibres on the substrate, forming a three dimensional fibre matrix; and
  d. curing the binder.

In a second option for the preferred first aspect the method comprises
  a. providing a starting material which comprises liquid carrier, fibres and binder, and providing a substrate in a mould;
  b. controlling a flow of starting material into the mould and passing the starting material over a substrate so as to deposit fibres onto the substrate;
  c. creating a chaotic flow of starting material over the substrate, forming a three dimensional fibre matrix; and
  d. curing the binder.

In one embodiment of the preferred first aspect both i) applying a vacuum force to the fibres on the substrate and ii) creating a chaotic flow of starting material over the substrate may be used to form the three dimensional matrix.

Preferably the fibres comprise carbon fibre.

According to a second aspect of the invention there is provided a fibre preform comprising a non woven substrate of fibres having a three dimensional matrix, wherein the fibres are held together in the matrix formation by a cured binder.

According to a third aspect of the invention there is provided a fibre preform which is a fibre matrix obtainable by the method of the first aspect.

The invention provides, in a fourth aspect, the use of a preform according to the second or third aspect in the manufacture of an article for use in high temperature applications, such as an article for use in brakes or rocket motor housings.

The invention provides, in a fifth aspect, a method of producing an article for use in high temperature applications, such as an article for use in brakes or rocket motor housings, the method comprising the steps of:
  i) providing a preform according to the second or third aspect;
  ii) carrying out a CVD or CVI process on the preform.

The invention also provides, in a sixth aspect, an article for use in high temperature applications, such as an article for use in brakes or rocket motor housings, comprising a preform according to the second or third aspect.

DETAILED DESCRIPTION OF THE INVENTION

Preferably, the starting material comprises liquid carrier, fibres and binder, wherein the fibres comprise carbon fibres.

In the present invention, fibre volume fractions as low as 15-18% and as high as in excess of 30% have readily been achieved in the laboratory. Fibre volume fractions of up to 40% or even higher are also achievable; although such higher fibre volume fractions may require inclusion of milled carbon particulate. The fibre volume fraction may therefore be from 15 to 40%, such as from 18 to 40%, e.g. from 20 to 35%; or it may be higher than this.

In one embodiment the fibre volume fraction is 15% or higher, e.g. from 15 to 75% or from 15 to 70%; or 18% or higher, e.g. from 18 to 75% or from 18 to 70%; or 20% or higher, e.g. from 20 to 75%, or from 20 to 70%, or from 20 to 65%, or from 20 to 60%, or from 20 to 55%, or from 20 to 50%.

A preferred range of fibre volume fraction is from 20% to 30% or more, e.g. from 20% to 50%, such as from 20 to 45%, especially from 20% to 40%. Such fibre volume fractions have not been achieved before in non-woven carbon fibre structures.

Although fibre volume fractions in this range have previously been obtained for inorganic materials, such as alumina fibre, these are fibres that will process readily. In contrast, the conventional wisdom is that other fibres, such as carbon fibre, will essentially be pulverised if subjected to the required processes. Thus the method of the present invention is highly advantageous in that it makes fibre volume fractions of from 20% to 30%, or even higher, achievable for all fibre types, including carbon fibres.

A particular advantage of the method of the first aspect is that products having fibre volume fractions of at least up to 30% can be obtained when the starting material is chopped polyacrylonitrile (PAN) carbon fibre. Additionally, fibre volume fractions of at least up to 40% can be achieved when the starting material is pitch based carbon fibre.

High fibre volume fractions, e.g. up to 50% or 60% or more, may be obtained when the starting material is virgin or recycled carbon fibre.

As is known in the art, fibre volume fractions may be measured by measuring a thickness of the matrix and weighing a sample of the matrix. A binder content of the sample may be established by weighing the sample, subjecting the sample to a temperature above which the binder will be burnt out, then reweighing, and calculating a weight difference between the weights. The temperature to which the sample must be heated is dependant on the binder type. Therefore the fibre volume and void volume per unit area can be calculated.

In one embodiment the three dimensional matrix is formed by creating a chaotic flow of starting material over the substrate, optionally in combination with applying a vacuum force to the fibres on the substrate.

Chaotic flow of the starting material over the substrate may be induced by the use of one or more means of inducing chaotic flow. Chaotic flow may be understood to be a flow in which the system behaviour is so dependent on the system's precise initial conditions that it is, in effect, unpredictable and cannot be distinguished from a random process. Typically in flow systems the flow of a chaotic system has a Reynolds number that is indicative of turbulent rather than laminar flow.

The Reynolds number (R) of a system is defined by R=(density of system)×(velocity of system)×(distance dropped by system or diameter of pipe through which system flows)/(viscosity of system). The density of the system is measured in $kg/m^3$ and the velocity in m/s. The distance or diameter is measured in m and the viscosity is measured in kg/m s.

The density is measured at room temperature and pressure. Viscosity is measured by a viscosity meter at room temperature and pressure, in particular by a Norcross M8BO viscosity meter (Norcross Corporation, Newton, Mass., USA). The velocity of the system (flow rate) is measured using a flowmeter at room temperature and pressure, in particular by a Titan FT2 Turbine flowmeter (Titan Flowmeters, UK).

A laminar flow system would have a value well below 2000, whereas a chaotic or turbulent flow system would have a Reynolds number of above 2000 and may be as high as 3000 or higher or even 4000 or much higher.

Chaotic flow of the starting material over the substrate may be induced by allowing the starting material to drop onto the substrate.

Alternatively or additionally, chaotic flow of the starting material over the substrate may be induced by passing the starting material over the substrate from a plurality of outlet points. The plurality of outlet points may be provided by a manifold having two or more outlets.

Alternatively or additionally, chaotic flow of the starting material over the substrate may be induced by supplying the starting material to the mould using a high pressure forced flow.

Alternatively or additionally, a restrictor plate could be inserted into a supply pipe creating a back pressure in the supply pipe and forcing the material out and onto the substrate with a higher force resulting in a chaotic flow of starting material over the substrate.

Alternatively or additionally, chaotic flow of the starting material on the substrate may be induced by supplying the starting material to the substrate from an angle and may in some embodiments be supplied to the substrate from sides of a mould. Preferably, the starting material is pumped into the mould under pressure. It may be desirable to provide opposing entry points for the starting material such that a cross flow of the starting material forms a chaotic flow over the substrate.

Alternatively or additionally, chaotic flow of the starting material over the substrate may be induced or assisted by providing multiple vacuum points below the substrate. A vacuum manifold may be provided to apply a number of vacuum locations to the substrate.

One or more means of inducing chaotic flow may be combined. For example, the starting material may drop onto the substrate from a single entry point or may pass over the substrate from a multipoint manifold in addition to a vacuum force being applied to the substrate.

In one embodiment a vacuum force may be applied to the substrate. It is preferred that a vacuum force is applied to the substrate such that liquid carrier is drained through the deposited fibres and is drained from the fibres.

In one embodiment the starting material passes from the holding container into the manifold and collects in the manifold. The starting material passes from the manifold through multiple manifold outlets onto the substrate. The manifold outlets may be substantially at 90° to a surface of the substrate or may be at an acute or obtuse angle thereto. Starting material may flow from the manifold outlets under pressure or may drain from the manifold under gravity.

In some embodiments the starting material is transferred to the manifold by gravity whilst in other embodiments transfer of the starting material may be by means of a pump. A peristaltic pump system is preferred to prevent fibre damage, but alternative pump systems may be used.

An advantage over known methods is that multiple flows of the carrier material through the substrate form a three dimensional stochastic structure on the substrate. In other words, the structure that is formed has fibres in the x, y and z directions and these fibres are randomly oriented.

It is desirable that flow of the liquid carrier from the starting material through the substrate is relatively quick. In one embodiment, the velocity of the liquid carrier is 1 m/s or more, such as 2 m/s or more, 3 m/s or more, 4 m/s or more or 5 m/s or more. In another embodiment, the velocity of the liquid carrier is 10 m/s or more.

Preferably, the flow of the liquid carrier is at a velocity as achieved by a drop of 1 meter or more under gravity.

In a preferred method the starting material is allowed to fall a distance from the holding container to the substrate. The substrate may be in a mould having side walls. In one embodiment the starting material falls from the holding container to the substrate in a single flow. A preferred distance is dependant on the volume of liquid carrier that is required to transfer the fibre. A rate of transfer may also influence a most preferred distance. The drop distance may be from 0.5 m to 10 m, such as from 0.5 m to 7.5 m; preferably from 0.75 m to 6 m and most preferably from 1 m to 5 m, such as from 1 m to 4 m or from 1 m to 2 m. In one embodiment a preferred distance is about 1.5 m.

In one preferred embodiment producing a 2000 gsm preform a full volume of starting material is transferred to a mould before draining is commenced. With a 1 $m^2$ substrate a volume of the mould is 4 $m^2$ and the distance is therefore 4 m. A 200 mm feed pipe is used for this embodiment. A distance may be reduced if simultaneous filling and draining of the mould is implemented.

The starting material may be pressurised before passing over the substrate.

It is desirable that there is a suitable pressure in the starting material to achieve a high velocity as the liquid carrier flows from the starting material through the substrate. Preferably this is a pressure of 5 kPa or greater, such as 6 kPa or greater, 7 kPa or greater, 8 kPa or greater, preferably 9 kPa or greater, e.g. 10 kPa or greater. In one embodiment, the minimum pressure of the starting material may be 15 kPa or more, e.g. 20 kPa or more, such as 30 kPa or more.

Preferably the starting material should be pressurised to a pressure greater than that a pressure created by falling the distance to the substrate in order to maximise chaotic flow over the substrate. An approximate value of a pressure generated by a drop is 103 kPa (15 psi) per 9.75 m (32 feet).

It is believed that a pressure of 1.5 or 2 times the pressure generated by the drop is desirable.

For a drop of 2 m a pressure of the starting material may be from 31 kPa (4.5 psi) or more, preferably from 41 kPa (6 psi) or more. For a drop of 4 m a minimum pressure of the starting material may be from 69 kPa (10 psi) or more, preferably from 90 kPa (13 psi). Higher pressures may be preferable.

It is desirable that the flow of the starting material over the substrate is chaotic and has a Reynolds number of 2000 or more, such as 2500 or more; preferably 3000 or more, such as 3500 or more; more preferably 4000 or more, e.g. 4500 or more, 5000 or more, 6000 or more, 7000 or more, 8000 or more, 9000 or more or 10,000 or more.

Very high Reynolds numbers may be achieved in some systems and may be as high as 140,000 to 160,000 or more.

One preferred range is from 3000 to 10,000 or higher, e.g. from 3000 to 200,000, such as from 4000 to 160,000. In some embodiments a preferred range is from 5000 to 25,500 or higher, e.g. from 5000 to 180,000. In other embodiments a preferred range may be from 25,500 to 100,000 or higher, e.g. from 25,500 to 170,000.

The starting material may enter a manifold before passing onto the substrate. The manifold may have a single outlet or may have multiple outlets, such as from two to twenty outlets, e.g. from two to ten outlets. Preferably the manifold has two, four, six, eight or ten outlets, depending on a size of the substrate to be covered. More outlets may be provided if the size of the substrate is increased. The starting material flows over the substrate in multiple flows. There are two or more flows of starting material over the substrate. In some embodiments there may be four or six or eight flows. The preferred number of flows may depend on an area of the substrate and matrix to be formed. The number of flows preferably increases with the area of the matrix to be formed. An outlet may be provided for each square foot (0.09290 $m^2$) of the substrate. Each outlet has a diameter and preferably each manifold outlet is the same diameter.

In conventional methods the fibres are laid down generally in two dimensions. Some fibres may be partially arranged in the third dimension but this is not a fully three dimensional matrix and furthermore a stochastic structure does not result. In the present invention, a three dimensional matrix is formed. Further, a stochastic structure can be produced.

In conventional methods as starting material flows towards the substrate it is predominantly orientated in the direction of the flow of the carrier material. As the flow impacts the substrate, flow is diverted to be in the plane of the substrate and fibres are accordingly orientated in the plane of the substrate and no longer perpendicular to the substrate.

In the method of the invention, the flow of starting material may be chaotic and a number of flows and counter currents direct the fibres in any number of orientations, so forming a stochastic structure. In such a stochastic structure the orientation of the fibres is 3 dimensional and fibres are arranged in x, y and z directions. Indeed, fibres may in fact be oriented in most, if not almost all, angles between the plane and 90 degrees thereto. For example, fibres may be oriented in 50% or more (such as 60% or more, 70% or more, 80% or more, 90% or more, or 95% or more) of the angles between the plane and 90 degrees thereto.

Individual fibres may be orientated from 0 to ±90° in the perpendicular from the horizontal. Individual fibres may also be randomly orientated within 360° rotation on the horizontal plane.

Preferably, in the 3 dimensional matrix formed in the present invention 5 wt % or more, such as 10 wt % or more, of the fibres are orientated substantially in a "z" direction. Preferably from 5 to 30 wt %, such as from 10 to 25 wt %, of the fibres are orientated substantially in a "z" direction. More preferably from 10 wt % to 20 wt % of the fibres are orientated substantially in the "z" direction.

It has been found that the formation of a matrix with a stochastic structure has provided a product, which can be used as a preform, containing a high percentage of voids. This is desirable to allow easy infusion of gases in CVD and liquids in CVI. A disadvantage of prior art preforms, which are formed by a layup of woven fibres, is that there are relatively few voids, so that infusion of gases or liquids is difficult and is a very slow process taking days or weeks. By comparison, the porosity of the matrix of the present invention allows relatively quick infusion of gases and the required gas infusion can take place in a matter of hours.

Preferably the matrix contains 10% or more voids by volume, such as 15% or more voids by volume; preferably the matrix contains 20% or more voids by volume and more preferably contains from 20 to 80% voids, such as from 20 to 70% voids, by volume. In one preferred embodiment the matrix contains from 30 to 70% voids by volume, such as from 30 to 60%. In one preferred embodiment the matrix contains from 40 to 70% voids by volume, and more preferably from 40% to 60%, such as from 40% to 50%.

The presence and arrangement of voids in the preform can be measured with a C scan or SEM microscopy or other similar technique. The size of individual voids may be measured by such techniques, but generally actual void content is averaged. The void content in a matrix is the difference between the fibre and binder content and 100% of the volume.

Further, the process of the present invention produces a matrix that has a random, rather than ordered or geometric, distribution of voids. This is beneficial because this means that gas infusion is optimised. In particular, there will be no specific geometries or paths which must be followed.

The presence of a random distribution may be established by examination of the matrix using a C-scan or SEM microscopy. Such techniques will allow the skilled person to see whether the voids lie in a random (non-ordered) distribution, as compared to a geometric or regular distribution.

It has been found that the chaotic flow of the carrier material over the substrate, which may, for example, result from the carrier material moving vertically from the holding container to the substrate creating an impact of the carrier material or a directed flow of carrier material in the third direction, improves the stochastic nature of the fibre matrix formed.

A desired fibre basis weight may affect the preferred form of delivery of the starting material to the substrate and removal of liquid carrier. It has been found that lower basis weight materials are satisfactorily formed using a system in which the starting material is delivered to the substrate by means of a single outlet point or multiple outlet points, such as from a manifold, or from side entry points which may be used in combination with single or multiple outlet points from above. A particularly preferred embodiment employs a system in which side entry feeds are combined with single or multiple entry points from above the substrate. Cross flows from the side entry points against the down flow increase a degree of chaotic flow in the starting material over the substrate.

If a fibre matrix is desired to have a fibre basis weight above 2000 gsm it may be preferable to provide drainage below the substrate by means of multiple draw points downstream the substrate. A manifold may be provided below the substrate. It is preferable that a total area of multiple outlet pipes is slightly less than an area of a common drain pipe, such that liquid carrier does not drain too quickly. It is preferred that a single outlet delivers starting material to the substrate. A single outlet may preferably be used as the feed for the starting material as the volume of fluid and fibre increases as the basis weight increases and a single outlet is required to cope with the flow of material onto the substrate. Alternative systems able to cope with a high flow rate may be used.

The starting material comprising the liquid carrier, fibres and binder may desirably form a slurry.

The starting material may be in a holding container prior to being passed over the substrate. The starting material in the holding container may be heated. Heating of the starting mixture facilitates the use of higher temperature binders. Use of a higher temperature also allows the use of more viscous materials for the liquid carrier.

The substrate may be provided in a mould or former. It is believed that control of a flow of starting material into the mould is an important aspect of the invention. It is also desirable that flow of the starting material in the mould and through the substrate is controlled.

The starting material may be provided for use in step a) by combining the liquid carrier, fibres and binder in any order. For example, fibres may be added to a liquid carrier, followed by the addition of binder. Alternatively, binder may be added to a liquid carrier, followed by the addition of fibres.

Preferably the starting material is in the form of a slurry or a dispersion of the fibres in the liquid carrier.

The liquid carrier may be an aqueous product, such as water or an aqueous solution, or may be a non-aqueous product, such as an organic solvent. In a preferred embodiment the carrier is an aqueous product. More viscous materials may be used as the liquid carrier if the starting material is heated prior to passing over the substrate.

The liquid carrier acts as a medium to separate the fibres and to move them via fluid flow to the substrate. It is desirable that the liquid carrier has a specific gravity lower than that of the fibres being used in the starting mixture. Use of a liquid carrier that has a specific gravity less than that of the fibre being used allows the liquid carrier to disperse the fibre without the fibre floating and to move the fibre in a flow of the liquid carrier. In an embodiment using carbon fibre, the carbon fibre has a specific gravity of 1.7 to 1.8 and so a liquid carrier having a specific gravity of less than 1.7 should preferably be used.

The liquid carrier may include one or more further constituents, which may, for example, be selected from additives known for use in wet laid non woven products, such as dispersion aids, viscosity modifiers, thixotropes and surfactants.

Preferably the starting material is a high shear mixture in which the fibres can be separated and flow freely. It is desirable to maintain a flow of fibres in the starting material and to prevent fibres settling at a bottom of the holding container. Agitation of the mixture may be used. The agitation may be continuous or may be intermittent. A shear mixer may be used.

Preferably the starting material has a low viscosity. Preferably the starting material has a viscosity that is less than 100 mPa s and more preferably less than 50 mPa s and yet more preferably less than 10 mPa s. Most preferably the starting material has a viscosity that is less than 5 mPa s and more preferably less than 3 mPa s and yet more preferably less than 2 mPa s. Preferably the viscosity of the starting material is from 0.1 mPa s to 1 mPa s, such as from 0.5 mPa s to 1 mPa s.

More preferably the liquid carrier has a low viscosity similar to that of water. It may be that the proportion of fibre added to the liquid carrier, relative to the volume of the liquid carrier, is controlled such that the starting material behaves as a non viscous solution and has a viscosity similar to that of water.

In one embodiment, therefore, the ratio of fibre to liquid carrier is controlled such that the overall viscosity of the starting material is similar to that of water, i.e. approximately 0.8 to 0.9 mPa s.

Preferably the substrate has a number of perforations, such as five or more, ten or more, or twenty or more perforations. In a preferred embodiment the fibres have a length greater than a diameter of at least one of the perforations. In a most preferred embodiment the fibres have a minimum length greater than the maximum diameter of the perforations.

The solution may be applied to the substrate in step b) such that a fibrous mat is formed on the substrate. The substrate is suitably planar or substantially planar. Fibres in the mat can therefore link in two dimensions parallel to a plane of the substrate as the fibres are deposited on the substrate as well as in a third dimension perpendicular to the substrate.

The substrate may be made of any suitable material, such as a plastic or metal or alloy, for example it may be made from steel or aluminium or a similar material. It is preferred that the substrate is formed of a material such that it is inert to the constituents of the liquid carrier, binder and fibres.

The substrate may be provided with a profile or rim defining an area in which the fibres are deposited. The profile or rim can act to funnel the liquid carrier through the perforations. The profile may be shaped as desired depending on a final use for the fibre matrix.

The profile may be formed with a number of flow points. The flow points may include entry points for entry of the starting material into the area in which the fibres are to be deposited. Alternatively or additionally the flow points may be one or more drainage points. Increasing a density of drainage points in a part of the substrate may increase the drainage flow in that area and draw more fibre to that part so increasing a density of deposited fibre in that part of the preform.

In one embodiment the substrate is in the form of a mesh. Alternatively the substrate may be a perforated screen. The mesh or screen or other substrate may be stationary or the mesh or screen or other substrate may be arranged to move, such as a conveyor belt.

A vacuum force may be applied to the fibres on the substrate in step c). Water, or other liquid, molecules in the deposited fibres are subjected to the vacuum force and move through the fibres under the vacuum force. As the water, or other liquid, molecules move through the fibres under the vacuum force the molecules orientate at least some of the fibres in a plane ("z" plane) angled to the plane of the substrate.

Movement of the carrier molecules through the deposited fibres under the vacuum force applied to the substrate further orientates at least some of the fibres in the z plane and assists in forming a stochastic structure.

In a preferred embodiment the vacuum force may be such that it achieves a low to medium degree of vacuum. The vacuum force may, for example, be 100 kPa (about 750 torr)

or lower, such as from 100 kPa down to 3 kPa (about 750 torr to about 25 torr) or from 3 kPa down to 100 mPa (about 25 torr to about $1\times10^{-3}$ torr). Alternatively, a high degree of vacuum may be achieved, by applying a vacuum force of 100 mPa or lower, such as from 100 mPa down to 100 nPa (about $1\times10^{-3}$ torr to about $1\times10^{-9}$ torr).

The vacuum force applied may affect the number of fibres orientated in the "z" plane. The vacuum force applied may also affect a distance that the fibres are moved in the "z" plane.

The vacuum force may be applied at an angle of from 45 degrees or more to the plane of the substrate, such as 60 degrees or more, preferably 70 degrees or more, or 80 degrees or more, such as 85 degrees or more. In a more preferred embodiment the vacuum force is applied at substantially 90 degrees to the plane of the substrate.

The substrate may be provided with a connection to a drain unit, such as a drainage pipe. A vacuum force may be applied by means of a suction pump, in particular a low vacuum suction pump, attached to the drain unit. The vacuum force may be applied by means of a multipoint vacuum manifold.

In a preferred method the fibres are applied to the substrate and initially some of the liquid carrier is allowed to drain from the fibres under gravity. Once a proportion of the liquid carrier has drained (for example 40 wt % or more, 50 wt % or more, 60 wt % or more, 70 wt % or more, or 80 wt % or more) the vacuum force is then applied to the fibres. This may act to remove a further proportion of the liquid carrier, as well as drawing the fibres into a three dimensional matrix.

The substrate may suitably be perforated and have a first surface and an opposing second surface. In a particularly preferred embodiment, the substrate is in the form of a perforated screen having a first surface and an opposing second surface.

The fibres are deposited on the first surface of the substrate. The vacuum force is preferably applied to the second opposing surface of the substrate. The vacuum force acts to draw the fibres towards the first surface of the perforated substrate and to form a three dimensional matrix of fibres. The vacuum force may be applied directly to the second surface of the substrate or may be applied remotely, e.g. when the substrate has a drain unit provided, the vacuum force may be applied to the end of the drain unit furthest removed from the second surface.

Preferably not all the moisture in the fibres is removed under the vacuum force, such that the fibrous matrix contains a proportion of moisture.

The starting material may comprise a fibre to liquid ratio from 1:25 to 1:200, such as from 1:50 to 1:150, preferably from 1:75 to 1:125. Lower ratios, such as 1:200, may be used for fibres having a length of 25 mm or greater, while higher ratios, such as 1:25, may be used for short fibres, such as those having a length of 3 mm or less. A preferred ratio of fibre to liquid is 1:100. As indicated above, the fibre to liquid ratio may be controlled to achieve a suitable viscosity for the starting material.

Once liquid has drained from the fibres applied to the substrate and the vacuum force has been applied, i.e. after step c), the fibre to liquid ratio may be reduced to the range of from 1:2 to 1:14, such as from 1:2 to 1:10, for example from 1:3 to 1:9. A preferred fibre to liquid ratio is from 1:5 to 1:9 and a particularly preferred ratio is 1:7.

In step d) the binder is cured. This acts to fix the 3D fibre matrix in a given shape, with a given fibre to volume fraction.

The curing step suitably involves the application of heat. In particular, the fibrous matrix may be heated to a temperature greater than the cure temperature of the binder. Suitably the binder has a cure temperature of 70° C. or higher and therefore step d) involves heating the fibrous matrix to 70° C. or higher.

The fibrous matrix may be dried by the application of heat in step d). Any suitable technique for applying heat may be contemplated. For example, the heat may be supplied in the form of a hot air supply passing over the substrate or the heating may achieved by electrical elements in the vicinity of the substrate. The fibrous matrix may be placed in an oven or may pass through an oven heated to a suitable temperature.

Preferably the curing step d) operates at a temperature from 70° C. to 450° C. In a more preferred embodiment the temperature may be from 100° C. to 450° C. A particularly preferred range is from 120° C. to 220° C. The curing temperature used may be dependant on the binder used and the thermal stability of the polymer binder. The curing temperature should be lower than the degradation temperature of the binder. In one embodiment of the method the curing temperature is in the range from 165° C. to 220° C.

Curing step d) may have a duration of from a few seconds to several minutes. Preferably the step d) may be from 10 seconds to 60 minutes. More preferably the duration may be from 1 minute to 30 minutes. The duration may include time increasing the temperature and cooling of the preform.

In a preferred optional step, the fibrous matrix formed in step c) is subsequently compressed. Preferably the fibrous matrix is compressed while the matrix contains moisture. The fibrous matrix may have been obtained by the application of a vacuum to the substrate. Alternatively or additionally the fibrous matrix may be a three dimensional matrix obtained by inducing a chaotic flow of the liquid carrier over the substrate. As referred to above, the chaotic flow may be induced by at least one of: the starting material flowing onto the substrate from a number of outlet points; under pressure; at an angle to the substrate; from a number of cross flows, or dropping onto the substrate.

A compression pressure of from 5 kPa or more, preferably 50 kPa to 50000 kPa or more, such as from 100 kPa to 25000 kPa or more, may be applied in this further optional compression step; this acts to reduce the thickness and volume of the fibrous matrix. The compression force may be applied by means of a static press. Alternatively, the compression force can be applied by means of a continuously fed nip roller or belt.

A preferred pressure may depend on the final volume fraction of fibre required. At low volume fractions of around 5-10% pressure of at least 40 N/cm$^2$ (400 kPa) may be applied. For higher volume fractions of 30%-40% a press pressure of 500 N/cm$^2$ (5000 kPa) or 25000 kPa or higher may be applied.

Preferably, the curing step d) is carried out either simultaneously with or after any optional compression step. It is preferred that the curing and compression occur simultaneously.

Surprisingly it has been found that compressing the fibrous matrix whilst it contains moisture (e.g. when the fibre to liquid ratio is in the range of from 1:2 to 1:14) and curing the binder at substantially the same time has an advantageous effect. In particular, when the matrix contains carbon fibres, it has been found that after this treatment the undesired friable properties of the carbon fibres that are normally associated with high pressure treatment are, surprisingly, not evident or excessive. Fibre breakage does not occur. It has been found that a significant proportion of the main body fibre lengths are not fractured, powdered or reduced by the application of a compression force.

Preferably, therefore, in step d) the binder is cured while pressure is applied. In one embodiment, a pressure is initially applied and then the binder is cured while the pressure continues to be applied.

Once the binder has cured, the fibre matrix (with its desired fibre to volume fraction, e.g. from 20% to 30% or more) will not be able to relax and spring back to a greater thickness (with a resulting reduction in fibre to volume fraction). Therefore there is no need to continue to apply pressure once the curing step d) has been completed.

Heat may continue to be applied to the fibre matrix once curing has been completed in order to fully dry the matrix. The temperature may be increased to a temperature at which curing takes place and maintained at that temperature until the matrix is cured and the temperature may then be adjusted to a temperature at which drying of the matrix occurs. The matrix may be dried at a temperature that is from 100° C. to 450° C. In a preferred embodiment the temperature may be from 100° C. to 400° C. and in a more preferred embodiment the temperature is from 250° C. to 400° C.

Heating of the matrix may be by means of a plate, such as a heavy metal plate. A plate may be provided on one side only of the matrix and is preferably provided on both sides of the matrix. In one embodiment the temperature of the matrix is increased continuously to the curing temperature. In a preferred embodiment the temperature is raised to 100° C. to 120° C. and held at this temperature for a period of time to allow steam to escape from the matrix. The period of time may be from a few minutes to a few hours. More particularly the time may vary from 5 minutes to 2 hours. The time may be dependent on a thickness of the matrix. In a preferred embodiment in which the thickness is 6 mm the heating time at 100° C. to 120° C. is 6 minutes; for an embodiment in which the thickness is 35 mm the heating time at 100° C. to 120° C. is 1 hour.

A pressure of 5 kPa or more, preferably 50 kPa to 50000 kPa, such as from 100 kPa to 25000 kPa, e.g. from 250 to 750 kPa, may be applied to the fibre matrix during step d). The pressure applied to the fibre matrix may be 50 N/cm$^2$ (500 kPa). Alternatively, the pressure applied may be 25 N/cm$^2$ (250 kPa). The pressure applied may be higher if the fibres are short.

It has been found desirable to apply pressure in two stages. A first stage reduces the matrix to approximately 50% thickness compared to the original thickness (such as from 40 to 60% thickness compared to the original thickness). A pressure of from 100 psi (670 kPa) to 300 psi (2070 kPa), more preferably from 200 psi (1380 kPa) to 300 psi (2070 kPa), such as about 250 psi (1725 kPa), may be used in the first stage. Preferably a higher pressure is used in a second stage to achieve increased fibre volume fraction. The pressures used in this second stage may be from 1000 psi (6890 kPa) to 4000 psi (27600 kPa) psi, such as from 1500 psi (10300 kPa) to 3000 psi (20700 kPa). It has been found that a secondary pressure of 1500 psi (10300 kPa) may produce a fibre volume fraction in the region of 20-25% and a secondary pressure of 3000 psi (20700 kPa) may increase the fibre volume fraction to 30-33%.

In one embodiment the fibrous matrix is further cooled under compression following the curing step d). However this is not essential and the matrix may be cooled under atmospheric pressure.

The deposition of fibres in step b), formation of a three dimensional structure in step c) and curing step d), plus any optional compression or cooling steps, may be a continuous process or may be a batch process.

The fibres in the starting material suitably comprise carbon fibre, such as PAN fibres and/or pitch carbon fibres and/or recycled carbon fibres. Other fibre types may also optionally be present with the carbon fibres. Such additional fibre types in the starting material may, for example, be selected from metal fibres, glass fibres, PPS, PEEK, aramid fibres such as Kevlar, or other fibres suitable for use in ablative and braking applications.

In one embodiment, fibres selected from glass fibres, metal fibres, PPS, PEEK, and aramid fibres such as Kevlar comprise from 0 to 80 wt % of the fibres, such as from 0 to 50 wt %. In one such embodiment glass or metal fibres comprise from 1 wt % to 20 wt % and more preferably from 2 wt % to 10 wt % and most preferably from 3 wt % to 7 wt % of the fibres. In one preferred embodiment metal or glass fibres comprise from 4 to 6 wt %, such as 5 wt % of the fibres. In one such preferred embodiment the binder is a vinyl acetate, vinyl chloride copolymer such as Mowlith VC600.

Preferably 10 wt % or more of the fibres are carbon fibre, such as 20 wt % or more, 25 wt % or more, 30 wt % or more, 33 wt % or more, 40 wt % or more or 50 wt % or more.

Blends of carbon fibre with other fibre types in weight ratios of from 1:4 to 4:1, e.g. from 1:3 to 3:1, such as from 1:2 to 2:1, can, for example, be envisaged; including a ratio of 1:1.

In one embodiment, 60 wt % or more of the fibres are carbon fibre, such as 70 wt % or more, 80 wt % or more, 90 wt % or more, 95 wt % or more or 99 wt % or more.

In one embodiment, 90 wt % or more, such as 95 wt % or more or 99 wt % or more, of the fibres are selected from carbon fibre, or carbon fibre in combination with one or more of glass fibres, metal fibres, PPS, PEEK, and aramid fibres such as Kevlar.

In one embodiment, the fibres in the starting material may be carbon fibre and may be selected from PAN (Polyacrylonitrile) fibres, pitch carbon fibres or recycled carbon fibres. It has surprisingly been found that recycled carbon fibres can be used and can be subjected to the treatments of the method without detrimental breakages to a substantial proportion of the carbon fibres. Carbon fibres may be recycled from a number of applications, such as fully woven, non-woven, unidirectional, 2D and 3D carbon fabrics, as well as fully resin infused and shaped composite structures. Recycled carbon fibres may be supplied and used as specific cut lengths or as a mix of random chopped lengths of fibres or as blends thereof.

It has been found that PAN or pitch carbon fibres having a diameter up to 20 microns, especially of from 5 microns up to 20 microns, and a fibre length from 1 mm to 60 mm are particularly suitable for use in the invention. Such fibres may be obtained in chopped tow form from SGL carbon Group, Toho Tenax and Zoltek. More preferably the carbon fibres have a diameter of from 5 microns to 10 microns and most preferably about 7 microns.

Alternatively, the fibres in the starting material may be selected from PPS (polyphenylene sulphide), PEEK (Polyether ether ketone), aramid fibres such as Kevlar, or other fibres suitable for use in ablative and braking applications.

In one embodiment a chopped fibre may be supplied. The chopped fibre may, for example, be as long as the substrate or as deep as the substrate. In one embodiment the substrate has a thickness of 35 mm or less, and the fibre used is fibre with a length of 100 mm or less. In one embodiment the substrate has a thickness of 35 mm or less, and the fibre used is fibre with a length of 50 mm or less. In one embodiment the substrate has a thickness of 35 mm or less, and the fibre used is fibre with a length of 25 mm or a blend of fibres having lengths of 25 mm and 50 mm.

The maximum fibre length in the present invention may be as long as 100 mm or possibly even greater. The minimum fibre length in the present invention may be as short as 1 mm or possibly even shorter.

In one embodiment, the maximum fibre length in the present invention may be as long as 60 mm but the maximum length will usually be 50 mm. In one embodiment, chopped fibres are used with lengths of no less than 1 mm and no more than 50 mm; these may involve all fibres having a single length within this range or the fibres having a mixture of two or more different lengths within this range. In particular a blend of chopped fibres with mixed lengths, wherein the minimum length is 1 mm and the maximum length is 50 mm, may be used.

In some embodiments, therefore, the fibres used may be a blend of fibres having different lengths, for example a blend of two or more different length fibres where the lengths are selected from 12 mm, 25 mm and 50 mm. A preferred blend is a 50/50 (wt) blend of 25 mm and 50 mm length fibres. An alternative blend comprises a random mix of fibres from 3 mm in length to 12 mm in length. A blend of fibre lengths selected may be dependent on a desired final thickness of the fibre matrix.

It is believed that longer fibres may be used. A limiting factor on the length of the fibres is the size of a pump or shear mixer used in agitating the holding container as it is desirable that the carbon fibres are not sheared in the course of agitation n the holding container. It is believed that use of a larger pump would allow the use of longer fibres.

It is also possible to use 100 wt % of a given length of fibres, such as 100 wt % 3 mm length fibres, or 100 wt % 6 mm length fibres, or 100 wt % 12 mm length fibres, or 100 wt % 18 mm length fibres, or 100 wt % 25 mm length fibres.

In another preferred embodiment the carbon fibres have a diameter from 6 microns to 12 microns. The length of the fibres may be selected from 3 mm to 50 mm, for example from 3 mm to 35 mm.

It can be advantageous to have at least a proportion of the fibres in the fibre matrix (e.g. 5 wt % or more of the fibres, such as 10 wt % or more of the fibres) as fibres that have a length which is at least half of the intended thickness of the final fibre matrix. Such fibres may provide substantial support to the fibre matrix and may provide a more resistant matrix. For example, fibre matrices having thicknesses of 32 mm may be produced from fibres that include at least some fibres having a length of 16 mm or more, e.g. 20 mm length or more, such as lengths of from 20 to 25 mm. Fibre matrices having thicknesses of 35 mm may be produced from fibres that include at least some fibres having a length of 17.5 mm or more, e.g. 20 mm length or more, such as lengths of from 20 to 25 mm.

If a desired thickness is 30 to 35 mm it has been found to be advantageous to use a blend of fibres having lengths from 3 mm to 25 mm.

Clearly, it will be understood that the processability of the fibre must be borne in mind and fibres having lengths above 50 mmm can be difficult to process. Therefore if a matrix having a thickness of above 100 mmm was desired, the benefit of having long fibres that can provide substantial support to the fibre matrix and that may provide a more resistant matrix might be outweighed by the increased difficulty of processing the longer fibres.

A particularly advantageous blend of fibres that can be used comprises a substantial proportion (e.g. 20 wt % or more, 30 wt % or more, or 40 wt % or more) of shorter fibres, such as fibres having a length of from 2 mm to 5 mm, e.g. about 3 mm, and up to 20 wt % (e.g. from 1 to 20 wt %, such as from 5 to 15 wt %) of longer fibres, such as 20 mm or longer fibres. The blend may also comprise intermediate length fibres, having a length of greater than 5 mm and up to 20 mm.

In one embodiment, there could be:
from 20 to 60 wt % (e.g. from 20 to 55 wt %) fibres having a length of from 2 mm to 5 mm,
from 20 to 70 wt % (e.g. from 30 to 65 wt %) fibres having a length of greater than 5 mm and up to 20 mm,
from 1 to 20 wt % (e.g. from 5 to 15 wt %) fibres having a length of from 20 mm to 50 mm.

It will be realised that if the desired thickness of the matrix is greater then longer fibres may be included in the fibre blend.

In a preferred embodiment of the invention recycled carbon fibres are used as some or all of the fibres. The recycled carbon fibres may, for example, be chopped to lengths between 3 mm and 100 mm. In one embodiment the recycled carbon fibres may, for example, be chopped to lengths between 3 mm and 25 mm.

In one embodiment, the fibres used are all recycled carbon fibres. In another embodiment, PAN carbon fibres are blended with recycled carbon fibres. The PAN fibres are preferably a blend of 12 mm and 25 mm fibres.

Recycled carbon fibre can be obtained from Milled Carbon in the UK and from CFK Valley Recycling in Germany. Recycled carbon fibre has been shown to have 90-95% of the original properties of virgin carbon fibre. Recycled carbon fibre can be used for commercially established application of carbon fibre, so reducing a cost of the process since virgin carbon fibre commands a high market price. In addition a more economic carbon-carbon composite is produced and the environmental impact of manufacture of carbon fibre from PAN is reduced since the fibres can be recycled and reused.

The fibres used may be a single form of fibre or may be a blend of two or more types of fibre. A preferred embodiment is a mixture of recycled carbon fibre and aramid fibres such as Kevlar. The starting material may contain a recycled carbon fibre having a single length or the recycled carbon fibre may be a blend of lengths. A particularly preferred blend of carbon fibre is a mixture of 3 mm and 12 mm lengths. The recycled carbon fibre and the aramid fibres may be blended in a preferred ratio of from 1:4 to 4:1 and a more preferred ratio is 1:2 to 2:1. A particularly preferred ratio is 1:1. The ratio may be determined by the performance characteristics of the desired end product. Increasing a proportion of carbon fibre increases stiffness and strength of the end product whilst aramid is suitable for increasing impact resistance and abrasion resistance properties.

Alternatively other blends of fibres may be used. It has been found that, for example, metal and glass fibres may be used in blends with carbon fibres.

Choice of starting fibre, fibre blend, uniformity of dispersion of the fibre in the solution and fibre length or blend of lengths can be controlled to select physical properties of the fibrous matrix formed. The matrix may be produced as a uniformly dense sheet or may contain agglomerated carbon fibre sites. It has been found that the inclusion of longer fibres, such as those having a length greater than 18 mm, may require more liquid to disperse the fibre in order to avoid a high level of agglomeration. It is believed that longer fibres contribute to a stronger final matrix.

A binder is included in the starting material. The binder may be selected from any suitable binder, and binders which are compatible with graphitisation and carbonisation processes are preferred. The binder should preferably be a binder that either, once cured, acts to adhere the fibres together to lock them into the matrix formation, or that, once cured, forms a filmic substrate within the matrix of the fibres to lock them into the matrix formation.

It is desirable that the binder, particularly where the binder is added as a dispersion or emulsion, should form a gel or agglomerations in the starting material. The binder may form a gel or agglomerations in the starting material without the addition of further constituents. Alternatively it may be preferable to add further constituents to improve the characteristics of the starting material. For example it may be desirable to include a flocculating agent. A preferred flocculating agent may be dependent on the binder selected. Alternatively it may be desirable to add a constituent that acts to destabilise the binder in the starting material and improves the formation of a gel. An advantage of using a binder forming a gel or agglomerations in the starting material is that the binder is held within the matrix formed and does not drain away. Alternatively binder may be added in the form of a powder and such binders do not gel but are trapped within the fibre matrix so that they do not drain away. A preferred binder may be chosen from epoxy novolac binders such as Phenodur VPW 1946 and 1942.

Binders that incorporate low carbonisable organic species in the matrix can be used but are less preferred. Such binders include urethanes, acrylics, methacrylates, styrenes, polyurethane co polymers.

More preferred binders may be selected from the group comprising phenols, poly vinyl imides and poly vinyl alcohols and vinyl acetate/vinyl chloride copolymers. Polyamides, PVC, PVDC, and polyvinyl sulphones may be used in some applications. Additionally binder materials such as PEEK (poly ether ether ketone), polyesters, polyhydroxyether and epoxy type material are believed to be suitable. A castor based hydroxy functional polyol sold under the trade name Bio Polyol by Bioresin of Brooklin, Sao Paulo in Brazil is known to be a binding agent suitable for use with carbon materials and may also be suitable. Epoxy novolacs may also be used.

Preferred binders are organic binders or silane binders. The binders may be supplied in a dry format as fibres or powders, or may be supplied as solutions, dispersions or emulsions. Binders used in the form of fibres or powders may not need the addition of flocculating agents and destabilising agents as the fibre length/powder size can be selected to be greater than the pore size of the matrix formed on the substrate such that the binder does not flow out of the matrix with the carrier liquid.

In one embodiment, phenolic binders are preferred as these do not incorporate species in the matrix and have high yield carbonisation properties and low shrinkage properties. Suitable water compatible phenolic binders such as Durophen 9340 or Durophen FN can be obtained from Cytec.

A suitable binder may also be acrylic latex.

In another preferred form of the invention the binder is a highly carbonisable imide binder, such as Homide 250 supplied by HOS Technik in Austria or Ultem supplied by Ensinger-Hyde as a dry powder.

In an alternative embodiment polyvinylpyrrilidone binder may be used. Materials such as Sunvidone®K supplied by Sunflower Technology Development Co. Ltd or Luvitec®K17 manufactured by BASF have been found to be particularly suitable.

It is desirable to use highly carbonisable binders as these can reduce the cost associated with burning out epoxy binders and sizing agents.

It is preferred that the fibre (especially carbon fibre) should be un-sized, as a primary use of the invention is to produce materials that are CVD or CVI ready. In contrast, conventionally it has been understood that if a carbon fibre matrix is to be pressed it is desirable that the carbon fibre should be sized in order to provide a protective coating for the carbon fibre while pressure is applied to the matrix.

Preferably, therefore, the carbon fibre and/or other blended fibres are un-sized although in some embodiments the fibre may be sized with a water compatible sizing.

It is preferred in the invention that the binder is thermosetting. A non thermoset binder that has been found to be suitable for use in the invention is Mowlith VC600 which is a vinyl acetate, vinyl dichloride copolymer. It is desirable that the binder is at least one of non ablative, compatible with resins, and resistant to environmental factors such as water and/or salt.

The binder may be added to the liquid carrier as a liquid or a solid. The binder is preferably stable in the liquid carrier but not so stable that it is not trapped in the fibre matrix in sufficient quantity to have a binding effect. Advantageously the binder forms a gel or agglomerations of polymer in the liquid carrier. Preferably the agglomerations are sized such that the polymer chains are too big to pass through the fibre matrix formed on the substrate. The binder may suitably be a binder that is cured at temperatures greater than 70° C., such as from 70 to 450° C., e.g. from 100 to 450° C. Preferably the binder is stable to a temperature greater than the curing temperature.

Preferably the binder is added such that the percentage of binder in the final product is from 5% to 60% of the final weight of the dried fibrous matrix. For example, the percentage of binder in the final product may be from 5% to 30% of the final weight of the dried fibrous matrix, such as from 5% to 25%. In a preferred embodiment the binder may comprise from 10% to 20% of the final weight of the matrix.

It may be desirable to include other agents in the starting material or to add such agents to the starting material before carrying out step b). The or each agent may be selected from a group comprising a dispersion agent, a surfactant, a thixotrope or a viscosity modifier, an additive that destabilises the binder in solution, a flocculation agent, an anti foam agent. Acids, bases and amines may be used as destabilising agents.

In one embodiment an additive filler material in the form of particulates may be included in the starting material or added to the starting material before step b) is carried out. Such an additive filler material may improve a functional performance or the final properties of the composite.

Additive filler materials may be added in an amount, as a percentage by weight of the dried fibrous matrix, of from 1% to 50%, e.g. from 5 to 45%, such as from 10 to 40%. The additive filler material may be supplied as a dry material or in a wet format in the form of a dispersion or solution.

Suitable additive filler materials include metals, silicon dioxides and carbon. It is known to include these materials in prior art non woven preforms but a separate process has been required to add them after the preform has been manufactured. An advantage of the present method is that the preform is manufactured with the additive incorporated therein and without the necessity of a separate manufacturing process.

In a preferred embodiment, silicon dioxide is added in a proportion from 10% to 20%, expressed as a percentage of dry weight of silica to weight of the dried fibrous matrix. The silicon dioxide can be added to the solution as a dry powder in the form of fumed silica or as a solution such as colloidal silica. Such materials can be obtained from WR Grace, Grace Division and EKA Chemicals. If a colloidal silica is used it is necessary to calculate how much colloidal silica is needed to provided the required amount of the dry weight of silica in the colloid, in order to determine the correct amount to add to the liquid carrier.

In one embodiment of the invention carbon particulates are used as additive filler materials. This can promote an efficiency of a subsequent pyrolysis process and can reduce a free volume space in the fibrous mat. In a subsequent carbon deposition process such as CVI a lower carbon deposit will be required since the free volume space is less. In a preferred embodiment milled carbon particles having a diameter of 10 microns or less are added.

It is desired that the additive filler materials should have a particle size of 250 microns or less. Preferably the size particulates of the additive filler material should be 100 microns or less, more preferably 50 microns or less and it is most preferred that the additive particulates have a size of 20 microns or less.

Preferably the diameter of the carbon particles used as additive filler materials is small, e.g. 100 microns or less, preferably 50 microns or less. Use of small diameter particles limits any impact of the particles on the fibre compression of the mat. Small carbon particles migrate to the larger pores in the mat as compression is applied. Consequent to this migration any gas, resin or liquid infusion material has to be subjected to a less tortuous infusion path.

In addition, use of small particles having a diameter of 10 microns or less facilitates a uniform distribution of the particulate through a structure of the fibrous mat. Furthermore it is believed that the use of small particles avoids the preferential filling of outer surfaces of the substrate. It is important to avoid filling of pores at the outer surface of the preform since if the outer pores become blocked it can be necessary to remove the pore blockage, by means of machining which can be expensive, in order to provide a porous path into the body of the preform and allow more effective carbonisation and infusion.

According to a second aspect of the invention there is provided a fibre preform comprising a non woven substrate of fibres having a three dimensional matrix, wherein the fibres are held together in the matrix formation by a cured binder.

The fibre preform may be a fibre matrix obtainable by the method of the first aspect.

The fibres in the preform may be as described above in the first aspect. Preferably the fibre preform comprises carbon fibres; optionally other fibre types may also be present (e.g. metal fibres, glass fibres, PPS fibres, PEEK fibres, or aramid fibres such as Kevlar fibres). Preferably the carbon fibres have a diameter of 5 microns or more. In a preferred embodiment the carbon fibres are selected from PAN, pitch carbon fibre or recycled carbon fibre. Alternative fibres may be PPS or PEEK or aramid fibres such as Kevlar fibres. In some embodiments the fibre may be a blend of fibres; the blended fibres may, for example, comprise carbon fibre and aramid fibre (such as Kevlar fibre). A weight ratio of from 1:4 to 4:1 may be used. A particularly preferred ratio is 1:1.

The fibres (of the same fibre type or blends of different types) may be the same length or may have different lengths.

The binder in the preform may be of the types as described above. In a preferred embodiment, the binder in the preform comprises carbonisable binder material, such as phenolic binder, imide binder or polyvinylpyrrilidone binder. The binder may, for example, be present in an amount of from 10 wt % to 20 wt % of the weight of the matrix.

In a preferred embodiment the preform further comprises an additive, which is an additive filler material in the form of particulates, such as carbon or silicon dioxide or metals. The additive filler material may be as described above. In one embodiment the additive is carbon in the form of milled carbon particles having a diameter of 10 microns or less. More preferably the filler has a diameter from 10 microns to 250 microns and a diameter from 20 microns to 250 microns is particularly preferred. The additive filler material may, for example, be from 5 wt % to 30 wt % of the weight of the matrix. As the fibre volume fraction increases, for a given thickness, the filler content can also increase.

In some embodiments the preform is a monolithic structure and this may result from a single forming structure. The monolithic structure does not have multiple layers. Preferably the preform is stochastic. The preform may be a layered 3-dimensional structure.

The preform may have a thickness from 1 mm to 250 mm. Preferably the thickness may be from 1 mm to 50 mm and more preferably from 1 mm to 40 mm.

A basis weight (weight per unit area) of the preform may be varied from 600 $g/m^2$ to greater than 100,000 $g/m^2$.

Preferably the preform contains 20% or more (such as 30% or more) voids by volume; preferably it contains from 20 to 80% voids, more preferably from 30 to 70% voids, for example from 30 to 60% voids by volume. In one embodiment the preform contains from 40 to 50% voids by volume.

Preferably the preform has a fibre volume fraction of from 10% to 40% or higher (e.g. from 20 to 70%) and more preferably from 20% to 40%. In one embodiment the fibres in the preform are PAN carbon fibre and the fibre volume fraction may be up to 30%. In another embodiment the fibres are pitch based carbon fibre and the fibre volume fraction may be up to 40%. In another embodiment the fibres are virgin or recycled carbon fibres and the fibre volume fraction may be up to 50 or 60% or even higher.

It is desirable that the preform has a 3D stochastic structure adapted to allow the infusion of gases and having a fibre matrix providing a resistant matrix. It has been found that a fibre volume fraction lower that 20% has insufficient resistive characteristics for use in brake applications and that a fibre volume fraction greater than 40% tends to block the pores within the structure and reduce the effectiveness of CVI.

The preform may be used as a matrix material with isotropic properties and as thin sheets that are easily handled. The preform may be used in CVD or CVI processes.

Heavy basis weight preforms according to the invention may be produced as rigid boards. The boards may be easily cut to shape prior to any conditioning in a CVD or CVI process. Thus expensive forming processes can be eliminated.

Preforms may be used in braking applications and in ablative applications such as furnace linings. In addition preforms may be used for other less demanding applications.

It has been found that fibre matrix may be used in preparing laminated preforms. One or more sheets of matrix may be combined with a layer of aramid fibres. Preferably two or more layers of matrix may be combined with one or more layers of aramid fibres. In one embodiment the one or more sheets of matrix have a thickness of 1 mm. The thickness may be from 0.5 mm to 100 mm. Preferably the thickness may be from 0.75 mm to 75 mm. The thickness may be from 1 mm to 50 mm. It has been found that the binder in the matrix acts as an adhesive for the aramid fibres. It has been found that resulting material has advantageous properties in being lightweight and having a high impact resistance.

A particularly preferred laminate has been made using layers of fibre matrix formed in accordance with the first aspect of the invention and containing recycled carbon fires laminated with a layer containing aramid fibres. In a preferred embodiment the laminate comprises three or more layers. The laminate may be formed with an aramid fibre core layer or with a carbon fibre core layer. The laminates may be formed by stacking and pressing the layers using a copolymer. A particularly preferred co polymer is a vinyl acetate/vinyl chloride copolymer. Alternative co polymers include methacrylates, urethanes, polyesters, PVOH, epoxides and styrenes.

Short chopped carbon fibre may be used as a filler between the layers of matrix. Alternatively woven pre pregs may be used between the matrix layers. Other particulates may be used such as $SiO_2$. It is believed that $SiO_2$ has not been used with wet laid and/or non woven substrates in the past.

According to a third aspect of the invention there is provided a fibre preform which is a fibre matrix obtainable by the method of the first aspect.

The preform according to the second or third aspect may be used in ablative, high performance, friction, wear and/or corrosion resistant applications.

The invention provides, in a fourth aspect, the use of a preform according to the second or third aspect in the manufacture of an article for use in high temperature applications, such as an article for use in brakes or rocket motor housings.

The invention provides, in a fifth aspect, a method of producing an article for use in high temperature applications, such as an article for use in brakes or rocket motor housings, the method comprising the steps of:
i) providing a preform according to the second or third aspect;
ii) carrying out a CVD or CVI process on the preform.

In one embodiment, step (i) may be achieved by carrying out a method according to the first aspect.

In one embodiment, step (ii) may be achieved by pyrolysis. It may involve chemical vapour deposition by hydrocarbons and gas, or infusion by thermosetting resin, or liquid impregnation by pitch or liquid silicone materials.

The invention also provides, in a sixth aspect, an article for use in high temperature applications, such as an article for use in brakes or rocket motor housings, comprising a preform according to the second or third aspect.

The article may be obtainable by the method of the fifth aspect.

In one embodiment, the article is a brake shoe lining.

The preferred features of the first aspect of the invention will be understood to also apply, where appropriate, to the second to sixth aspects of the invention.

Figure 2:
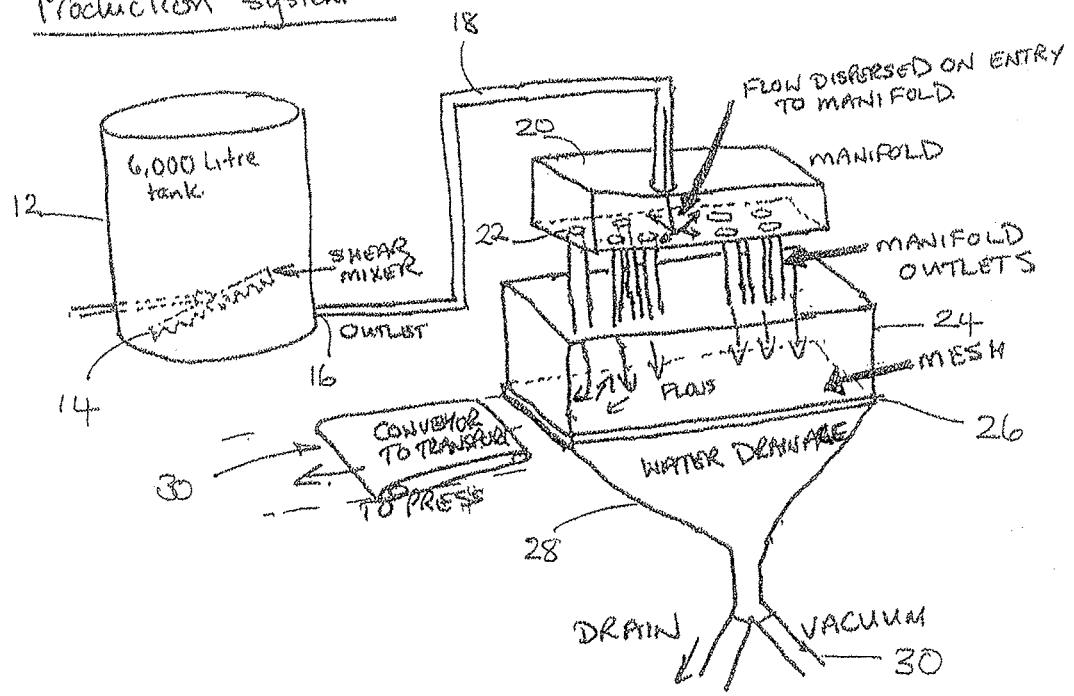
Figure 3:
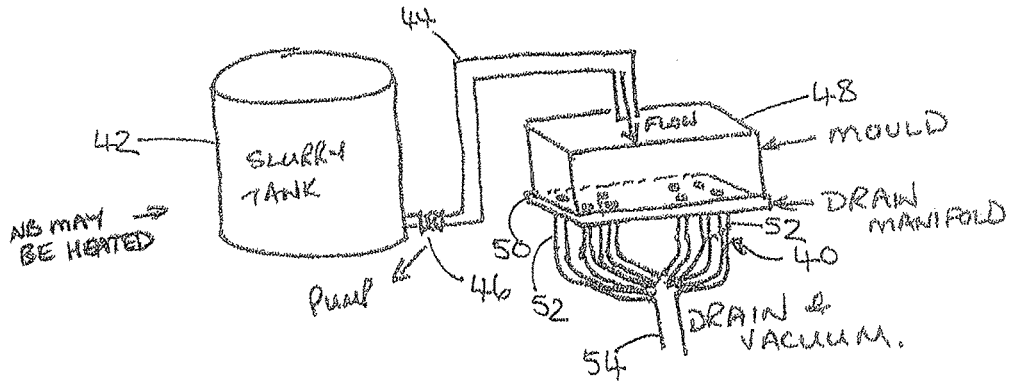
Figure 4:
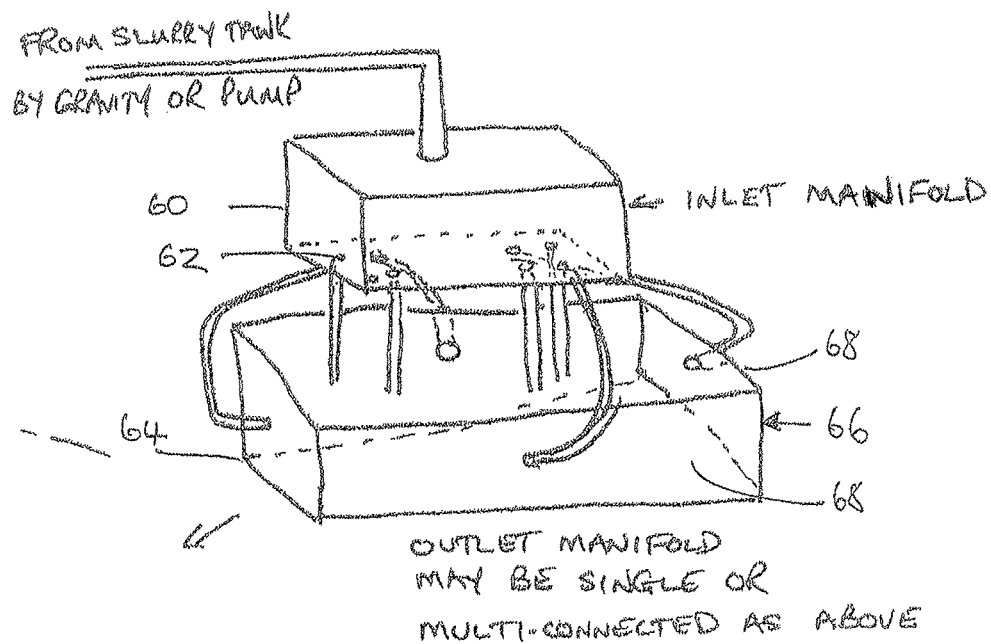

The invention will now be further described by way of example only with reference to the following examples and drawings in which:

FIG. 1 is a sketch of a laboratory test system;
FIG. 2 is an illustration of a production system,
FIG. 3 is an illustration of an alternative production system utilising a multiple vacuum manifold, and
FIG. 4 is an illustration of an alternative production system having a chaotic flow over the substrate.

In FIG. 1 a starting material comprising slurry 1 formed of a liquid carrier, binder and carbon fibres is poured and dropped from a container 2 onto a substrate comprising a mesh 4 located at a base of a mould 6. A mould wall 8 surrounds the mesh 4 and chaotic flow of the starting material occurs in the mould 6. Liquid carrier material drains through the mesh 4 and into the drain 10. A vacuum force is applied to the drain 10.

FIG. 2 illustrates a production system in which the starting material is prepared in a holding container 12 having a shear mixer 14 which agitates the starting material. The starting material flows out of the holding container by means of outlet 16 through a pipe 18 and into a manifold 20. The starting material is dispersed in the manifold and drained from manifold outlets 22 into a mould 24. In this embodiment the manifold is provided with eight manifold outlets and the starting material drains into the mould 24 under gravity. The manifold is positioned approximately at least 100 cms above a mesh substrate 26 located in a base of the mould 24. The starting material flows into the mould 24 from the eight manifold outlets 22, and counter currents and cross flows are set up within the starting material in the mould creating a chaotic flow therein and forming a three dimensional stochastic matrix.

Liquid carrier is drained from the mould through a drainage channel 28. A vacuum force is applied by a vacuum 30. The mesh substrate 26 is removed from the mould 24 and moved by means of a conveyor 30 to a press where the preform can be placed under pressure and heated to cure the preform.

FIG. 3 illustrates an alternative production system utilising a multiple vacuum manifold 40 drawing liquid carrier from the substrate. The system is largely the same as the production system described with reference to FIG. 2. The system comprises a holding container 42 containing dispersed fibre. The starting material may be heated prior to being held in the holding container or the contained may be heated. The starting material is removed from the holding container by means of a pipe 44 and a pump 46 controls removal of the starting immaterial. The starting material flows into a mould 48 and drops onto a substrate 50 located at a base of the mould 48. It will be understood that the pump 46 may pump the starting material into the mould 48 under pressure. A draw manifold 40 is located below the substrate 50 and has multiple draw points 52 which lead to a central drain 54. The provision of multiple draw points 52 in the vacuum manifold 40 creates a number of flows of liquid carrier through the matrix deposited on the substrate and forms a three dimensional fibre matrix structure.

FIG. 4 illustrates and alternative embodiment of a production system in which a manifold 60 is fed from a holding container by means of a gravity feed or a pump. The manifold 60 has a number of outlets 62. Of these eight outlets 62 are arranged to deliver starting material vertically to the substrate 64 located at the base of a mould 66. Additional outlets from the manifold 60 are connected to sides 68 of the mould 66.

EXAMPLES

All of the examples were prepared using the process of the invention, with the starting material comprising the stated liquid carrier, fibres and binder being passed over a substrate so as to deposit fibres onto the substrate, a three dimensional fibre matrix being formed and the binder being cured.

Example 1

A 0.0968 m² sample was prepared using the process of the invention.

A starting material was prepared using:
480 g of a fibre blend (50 wt % 25 mm carbon fibre and 50 wt % 50 mm carbon fibre)
12 kg of water
120 g of binder (acrylic based binder system)

This starting material was dropped over a mesh substrate so as to deposit fibres onto the substrate, and then subjected to a vacuum force of approximately 550 torr before then being heated to a temperature of 170° C. under a compression force of 70 N/cm².

A sheet of 10.2 mm thick, with a fibre volume of 23% and basis weight of 4000 gm², was produced. A void content of approximately 69% was present in the product of this example.

Example 2

A further sample was prepared using the same methods and materials as in Example 1. However, 30 wt % of colloidal silica was added to the starting material.

The final fibre volume fraction in this case was 26%, with a thickness of 8.2 mm and basis weight of 3650 gm². A void content of approximately 60% was present in the product of this example.

Examples 3-8

In all these examples, a 10 kg, 20 kg or 30 kg batch of the end product was made.

Example 3

A starting material was prepared using:
PAN virgin fibre blend (40 wt % 3 mm long; 30 wt % 6 mm long; 25 wt % 12 mm long; 5 wt % 25 mm long)
polyvinyl (PVOH) binder
water
No filler was added.

A pump feed was used to pressurise the starting material, to give a Reynolds number for this feed in excess of 4000. This starting material was passed over a mesh substrate, so as to deposit fibres onto the substrate, and then subjected to a vacuum force of approximately 600 torr, before then being heated to a temperature of 180° C. under a compression force of approximately 120 N/cm².

The fibre matrix produced comprised:
carbon fibre 80 wt %
PVOH binder 20 wt %.

A preform was prepared having a size of 650 mm×650 mm and a thickness from 16 mm to 32 mm. The basis weight was from 12200 gm² to 13200 gm².

The fibre volume fraction for 32 mm thickness product was from 23% to 24%. A void content of approximately 70% was present in this product.

The fibre volume fraction for 16 mm thickness product was 49%. A void content of approximately 37.5% was present in this product.

Example 4

A starting material was prepared using:
PAN virgin fibre blend (40 wt % 3 mm long; 30 wt % 6 mm, 25 wt % 12 mm long; 5 wt % 25 mm long)
polyvinyl (PVOH) binder
water
No filler was added.

A pump feed was used to pressurise the starting material, to give a Reynolds number for this feed in excess of 4000. This starting material was passed over a mesh substrate, so as to deposit fibres onto the substrate, and then subjected to a vacuum force of approximately 600 torr before then being heated to a temperature of 180° C. under a compression force of 120 N/cm².

The fibre matrix produced comprised:
carbon fibre 85 wt %
PVOH binder 15 wt %.

A preform was prepared having a size of 500 mm×500 mm and a thickness from 16 mm to 32 mm. The basis weight was from 12200 gm² to 13200 gm².

The fibre volume fraction for 32 mm thickness product was from 23% to 24%. A void content of approximately 71.5% was present in this product.

The fibre volume fraction for 16 mm thickness product was 49%. A void content of approximately 39% was present in this product.

Example 5

A starting material was prepared using:
100% recycled carbon (random blend of fibre lengths between 3 and 12 mm)
polyvinyl (PVOH) binder
water
a filler of milled carbon, having a maximum particle diameter size 50 μm, provided as a dispersion in a liquid carrier with a PVP binder.

A pump feed was used to pressurise the starting material, to give a Reynolds number for this feed in excess of 4000. This starting material was passed over a mesh substrate, so as to deposit fibres onto the substrate, and then subjected to a vacuum force of approximately 700 torr, before then being heated to a temperature of 180° C. under a compression force of 140 N/cm².

The fibre matrix produced comprised
carbon fibre 70 wt %
PVOH binder 10 wt %
milled carbon 15 wt %
PVP binder 5 wt %.

A preform was prepared having a size of 500 mm×500 mm and a thickness of 32 mm. The fibre volume fraction was from 23% to 24% and the basis weight was from 12200 gm² to 13200 gm². A void content of approximately 69% was present in this product.

Example 6

A starting material was prepared using:
PAN virgin fibre blend (25 wt % 3 mm long; 25 wt % 6 mm long; 35 wt % 12 mm long; 15 wt % 25 mm long)
polyvinyl (PVOH) binder
water
a filler of milled carbon, having a maximum particle diameter size 50 μm, provided as a dispersion in a liquid carrier with a PVP binder.

A pump feed was used to pressurise the starting material, to give a Reynolds number for this feed in excess of 4000. This starting material was passed over a mesh substrate, so as to deposit fibres onto the substrate, and then subjected to a vacuum force of approximately 700 torr, before then being heated to a temperature of 180° C. under a compression force of 140 N/cm².

The fibre matrix produced comprised
carbon fibre 70 wt %
PVOH binder 10 wt %
milled carbon 15 wt %
PVP binder 5 wt %.

A preform was prepared having a size of 500 mm×500 mm and a thickness of 32 mm. The fibre volume fraction was from 23% to 24% and the basis weight was from 12200 gm² to 13200 gm². A void content of approximately 69% was present in this product.

Example 7

A preform was prepared having a size of 500 mm×500 mm and a thickness of 6 mm.
Variant A
  A starting material was prepared using:
    PAN virgin fibre blend (40 wt % 3 mm long; 30 wt % 6 mm long; 25 wt % 12 mm long; 5 wt % 25 mm long)
    polyvinyl (PVOH) binder
    water
  A pump feed was used to pressurise the starting material, to give a Reynolds number for this feed in excess of 4000. This starting material was passed over a mesh substrate, so as to deposit fibres onto the substrate, and then subjected to a vacuum force of approximately 600 torr, before then being heated to a temperature of 170° C. under a compression force of 260 N/cm².
  The fibre volume fraction was about 30% and the basis weight was from 2550 gm² to 3100 gm². A void content of approximately 65% was present in this product.
Variant B
  A starting material was prepared using:
    PAN virgin fibre blend (40 wt % of 3 mm fibre, 30 wt % of 6 mm fibre, 25 wt % of 12 mm fibre, 5 wt % of 25 mm fibre) plus milled carbon particulate;
    polyvinyl (PVOH) binder
    water
    a filler of milled carbon, having a maximum particle diameter size 50 μm, provided as a dispersion in a liquid carrier with a PVP binder
  A pump feed was used to pressurise the starting material, to give a Reynolds number for this feed in excess of 4000. This starting material was passed over a mesh substrate, so as to deposit fibres onto the substrate, and then subjected to a vacuum force of approximately 700 torr, before then being heated to a temperature of 180° C. under a compression force of 240 N/cm².
  The fibre volume fraction was about 30% and the basis weight was from 2550 gm² to 3100 gm². A void content of approximately 60% was present in this product.
  The fibre matrix produced comprised:
    carbon fibre 70 wt %
    PVOH binder 10 wt %
    milled carbon 15 wt %
    PVP binder 5 wt %.

Example 8

A preform was prepared having a size of 500 mm×500 mm and a thickness of 35 mm or 17.5 mm.

Variant A
  A starting material was prepared using:
    100% recycled carbon fibre (random blend of fibre lengths between 3 and 12 mm)
    polyvinyl (PVOH) binder
    water
    No filler was used.
  A pump feed was used to pressurise the starting material, to give a Reynolds number for this feed in excess of 4000. This starting material was passed over a mesh substrate, so as to deposit fibres onto the substrate, and then subjected to a vacuum force of approximately 700 torr, before then being heated to a temperature of 180° C. under a compression force of 260 N/cm².
  The fibre matrix produced comprised:
    carbon fibre 85 wt %
    PVOH binder 15 wt %
  The fibre volume fraction was about 30% and the basis weight was from 14,900 gm² to 17,900 gm². A void content of approximately 65% was present in the 35 mm thickness product.
Variant B
  A starting material was prepared using:
    recycled carbon fibre blend (random blend of fibre lengths between 3 and 12 mm)
    polyvinyl (PVOH) binder
    water
    a filler material comprising milled carbon having a maximum particle diameter size 50 μm, provided as a dispersion in a liquid carrier with a PVP binder
  A pump feed was used to pressurise the starting material, to give a Reynolds number for this feed in excess of 4000. This starting material was passed over a mesh substrate, so as to deposit fibres onto the substrate, and then subjected to a vacuum force of approximately 600 torr, before then being heated to a temperature of 170° C. under a compression force of 240 N/cm².
  The fibre matrix produced comprised
    carbon fibre 60 wt %
    PVOH binder 10 wt %
    milled carbon filler 25 wt %
    PVP binder 5 wt %.
  The fibre volume fraction was about 30% and the basis weight was from 14,900 gm² to 17,900 gm². A void content of approximately 57.5% was present in the 35 mm thickness product.

Example 9

A preform was prepared having a size of 500 mm×700 mm and a thickness of 3 mm or 17 mm.
A starting material was prepared using:
  100% recycled carbon fibre (random blend of fibre lengths between 3 and 100 mm)
  vinyl acetate/vinyl chloride copolymer binder (Mowlith VC600)
  water
  No filler was used.
This starting material was dropped from a height onto a mesh substrate, so as to deposit fibres onto the substrate, and then subjected to a vacuum force of approximately 700 torr, before then being heated to a temperature of 180° C. under a compression force of 260 N/cm².
The fibre matrix produced comprised
  carbon fibre 70 wt %
  binder 30 wt %

The first product made had a basis weight of 16000 gsm and a thickness of 17 mm. The fibre volume fraction was 52% and the void fraction was 23%.

The second product made had a basis weight of 2000 gsm and a thickness of 3 mm. The fibre volume fraction was 36% and the void fraction 40%.

Example 10

A laminated material was produced using a fibre matrix formed in accordance with the invention. A substrate having an overall fibre basis weight of 3000 gsm was formed of three layers. An upper and a lower portion of the laminate was 1000 gsm formed from 6 mm chopped aramid fibres (Kevlar). A core of the laminate was formed of 1000 gsm substrate formed from recycled carbon fibre of fibre lengths between 3 mm and 12 mm. The core was formed in accordance with the method set out above (in Example 9). The layers were stacked and pressed using a vinyl acetate/vinyl chloride copolymer (Mowlith VC600) at 10% addition at a temperature of 170° C. The layers comprising Kevlar fibres were also formed in accordance with the invention. The laminate had a final fibre volume fraction of around 30% and a void fraction of around 68%.

Example 11

An alternative version of a laminated material was formed by using a substrate of 1000 gsm overall fibre basis weight formed using recycled carbon of lengths between 3 mm and 23 mm and made in accordance with the method set out above (in Example 9), as an upper layer and a lower layer. A core layer formed of 6 mm chopped aramid fibres (Kevlar) was used. The core layer had an overall fibre basis weight of 1000 gsm. The laminated material was formed by stacking and pressing using a vinyl acetate/vinyl chloride copolymer (Mowlith VC600) at 10% addition and was cured at 170 C. The laminated material had an overall fibre basis weight of 3000 gsm and a fibre volume fraction of about 30% and a void fraction of around 68%.

Example 12

A fibre matrix was formed using a blend of fibres. In this example 6 mm Kevlar chopped fibres and recycled carbon fibre having a chopped length from 3 mm to 12 mm were blended in a ratio of 1:1 (weight ratio) of recycled carbon fibres and Kevlar fibres. The method of Example 9 was used. The fibre matrix was pressed and cured with 10% Mowlith VC600 vinyl acetate/vinyl chloride binder to give a fibre volume fraction of around 30% and a void fraction of around 68%.

It is believed that aramid fibre blend variants, as shown in Examples 10-12, may be particularly useful for friction and ballistic applications.

Example 13

A fibre matrix was formed using virgin carbon fibre. The material that was combined with water to provide the starting material was:
    3 mm fibre—30 wt %
    6 mm fibre—20 wt %
    12 mm fibre—15 wt %
    25 mm fibre—5 wt %
    vinyl acetate/vinyl chloride copolymer binder (Mowlith VC600)—30 wt %

The starting material was passed to a mesh substrate, located in a mould, via a manifold having a single entry and eight exits. The starting material drops into the manifold via its single entry and drains from the eight manifold outlets into the mould. The manifold is positioned above the mesh substrate so that the slurry drops from a height onto the mesh substrate.

The starting material passed over the mesh substrate, so as to deposit fibres onto the substrate, and was subjected to a vacuum force of approximately 700 torr, before then being heated to a temperature of 180° C. under a compression force of 260 N/cm$^2$.

A 16000 gsm sheet was pressed to a thickness of 13.5 mm to give a fibre volume fraction of approximately 66% and a void fraction of approximately 30%.

Example 14

A fibre matrix was formed using recycled carbon fibre. The material that was combined with water to provide the starting material was:
    chopped random recycled carbon (lengths between 3 mm-12 mm)—70 wt %
    vinyl acetate/vinyl chloride copolymer binder (Mowlith VC600)—30 wt %

The starting material was passed to a mesh substrate, located in a mould, via a manifold having a single entry and eight exits. The starting material drops into the manifold via its single entry and drains from the eight manifold outlets into the mould. The manifold is positioned above the mesh substrate so that the slurry drops onto the mesh substrate.

This starting material was passed over the mesh substrate, and was subjected to a vacuum force of approximately 700 torr, before then being heated to a temperature of 180° C. under a compression force of 260 N/cm$^2$.

A 16000 gsm sheet was pressed to a thickness of 13.5 mm to give a fibre volume fraction of approximately 66% and a void fraction of approximately 30%.

Binder Tests

A number of different binders have been experimented with and their usefulness compared. A table setting out a summary of the results follows. In the table FBW is the fibre basis weight in grams per square meter and VF is the fibre volume fraction.

| Chemical Type | Binder Type | Recipe | FBW Made | % Percol Used | Binder % INPUT | Binder % OUTPUT | VF Possible | Comments |
|---|---|---|---|---|---|---|---|---|
| Carboxylated acrylic | Rohm and Haas Aquaset 150 | Addition 180 C. Press | 1000 | 0 | 20 | 0 | 0 | |
| Carboxylated acrylic | Rohm and Haas Aquaset 150 | Addition 180 C. Press | 1000 | 0 | 40 | 0 | 0 | |
| Carboxylated acrylic | Rohm and Haas Aquaset 150 | Addition + flocced with Percol 180 C. Press | 1000 | 300 | 50 | 0 | 0 | |
| Carboxylated | Rohm and Haas | Addition + flocced with | 1000 | 100 | 50 | 0 | 0 | |

-continued

| Chemical Type | Binder Type | Recipe | FBW Made | % Percol Used | Binder % INPUT | Binder % OUTPUT | VF Possible | Comments |
|---|---|---|---|---|---|---|---|---|
| acrylic | Aquaset 150 | Al sol 180 C. Press | | | | | | |
| Vinyl acetate/ vinyl chloride | Celanese Mowlith VC600 | Addition 180 C. Press | 1000 | 0 | 20 | 0 | 0 | |
| Vinyl acetate/ vinyl chloride | Celanese Mowlith VC600 | Addition 180 C. Press | 1000 | 0 | 40 | 0 | 0 | |
| Vinyl acetate/ vinyl chloride | Celanese Mowlith VC600 | Addition + flocced with Percol 180 C. Press | 1000 | 300 | 20 | 15 | 27 | No relaxation or softening after 24 hours submerged in water - suitable storm shielding |
| Vinyl acetate/ vinyl chloride | Celanese Mowlith VC600 | Addition + flocced with Percol 180 C. Press | 1000 | 300 | 40 | 35 | 30 | No relaxation to 430 C., 450 C. totally relaxed - suitable for CVI process |
| Vinyl acetate/ vinyl chloride | Celanese Mowlith VC600 | Addition + flocced with Percol 180 C. Press | 6000 | 300 | 25 | 15 | 31-35 | Made 10-11 mm thick = 31-35% VF |
| Styrene acrylic | Celanese Vinacryl 7179 | Addition + flocced with Percol 180 C. Press | 1000 | 300 | 20 | 18 | 30+ | relaxed at 400 C. - not suitable for CVI process |
| Styrene acrylic | Celanese Vinacryl 7179 | Addition + flocced with Percol 180 C. Press | 1000 | 300 | 40 | 35 | 30+ | No relaxation or softening after 24 hours submerged in water - suitable storm shielding |
| Styrene acrylic | Celanese Vinacryl 7179 | Addition + flocced with Percol 180 C. Press | 6000 | 300 | 25 | 20 | 30+ | |
| Carboxylated acrylic | Rohm and Haas Aquaset 150 | Addition + flocced with Percol 1000% 180 C. Press | 1000 | 1000 | 100 | 0 | 0 | Not possible need Ca ion |
| Bismaleimide | Evonik Compimide P500 | Added powder pre mixed with water 180 C. Press | 1000 | 0 | 30 | 0 | 0 | Not possible with water drawn process |
| Epoxy/Novolac | Phenodur VPW1946 | Added before fibre and then added fibre and then Percol 180 C. Press | 1000 | 200 | 30 | 7.5 | 16 | Percol worked well but 200% not enough - 7.5% binder produced medium VF |
| Epoxy/Novolac | Phenodur VPW1946 | Added before fibre and then added fibre and then Percol 180 C. Press | 1000 | 300 | 30 | 15 | 18 | |
| Epoxy/Novolac | Phenodur VPW1946 | Added before fibre and then added fibre and then Percol 180 C. Press | 1000 | 400 | 30 | 15 | 20 | |
| Epoxy/Novolac | Phenodur VPW1946 | Added before fibre and then added fibre and then Percol 180 C. Press | 1000 | 600 | 30 | 22.5 | 23 | |
| Epoxy/Novolac | Phenodur VPW1946 | Added before fibre and then added fibre and then Percol 200 C. Press | 1000 | 1000 | 35 | 35 | 32+ | 200 C. Press started to make material brown indicating binder starting to decompose |
| Epoxy/Novolac | Phenodur VPW1942 | Added before fibre and then added fibre and then Percol 200 C. Press | 1000 | 800 | 35 | 18 | 17 | 200 C. Press worked fine - could go to 230 C. |
| Epoxy/Novolac | Phenodur VPW1942 | Added before fibre and then added fibre and then Percol 200 C. Press | 1000 | 900 | 35 | 20 | 21 | 200 C. Press worked fine - could go to 230 C. |
| Epoxy/Novolac | Phenodur VPW1942 | Added before fibre and then added fibre and then Percol 200 C. Press | 1000 | 1000 | 35 | 17 | 21 | 200 C. Press worked fine - could go to 230 C. |
| Epoxy/Novolac | Phenodur VPW1942 | Added before fibre and then added fibre and then Percol 200 C. Press | 1000 | 1200 | 35 | 22.5 | 23 | 200 C. Press worked fine - could go to 230 C. |
| Polyether/ Polyurethane | Impranil | Addition + flocced with Percol 1000% 180 C. Press | 1000 | 1000 | 30 | 0 | 0 | Not possible need different floc? |
| Polyester/ Urethane | Baybond | Addition + flocced with Percol 1000% 180 C. Press | 1000 | 1000 | 30 | 22 | 12 | Soft and like rubber |
| Acrylic | Fulatex PD2163 | Addition + flocced with Percol 1000% 180 C. Press | 1000 | 1000 | 30 | 30 | 22 | |
| Acrylic | Fulatex PD2163 | Addition + flocced with Percol 500% 180 C. Press | 1000 | 500 | 30 | 27 | 18 | |
| Acrylic | Fulatex PD2163 | Addition + flocced with Percol 250% 180 C. Press | 1000 | 250 | 30 | 22 | 15 | |
| Acrylic | Fulatex PD2163 | Addition + flocced with Percol 125% 180 C. Press | 1000 | 125 | 30 | 10 | 10 | |
| Acrylic | Fulatex PD2163 | Addition + flocced with Percol 700% 180 C. Press | 6000 | 700 | 30 | 30 | 32 | Excellent Hard Binder - easy to use and floc HIGH VF Possible |
| Polyether Urethane | Baybond PU405 | Addition + flocced with Percol 200% 180 C. Press | 1000 | 200 | 30 | 30 | 23 | Soft Binder |
| Polyurethane | Baybond XP2596 | Addition + flocced with Percol 200% 180 C. Press | 1000 | 200 | 30 | 30 | 25 | Harder than PU but still soft |
| Epoxy/Novolac | Phenodur VPW1946 | To pulper 5 g acid 1.7 pH 95 g water and carbon fibre, then added 25% solids, long mix | 1000 | 1000 | 25 | 20 | 32+ | 200 C. Press started to make material brown indicating binder starting to decompose |

-continued

| Chemical Type | Binder Type | Recipe | FBW Made | % Percol Used | Binder % INPUT | Binder % OUTPUT | VF Possible | Comments |
|---|---|---|---|---|---|---|---|---|
| Epoxy/Novolac | Phenodur VPW1946 | To pulper 3 g acid 1.7 pH 95 g water and carbon fibre, then added 25% solids, long mix | 1000 | 1000 | 25 | 22 | 32+ | 200 C. Press started to make material brown indicating binder starting to decompose |

From the above results it can be seen that carboxylated acrylic with Percol did not in this trial form a suitable matrix for high fibre volume fractions. However, it is believed that an alternative destabilising agent would form a suitable gel in the starting material and improve the results achieved for applications requiring a high fibre volume fraction. Improved results have been achieved with the use of calcium sulphate as a destabilising additive, causing gelling and improving polymer pick up on the substrate.

It can be seen that acrylic binder in the form of Fulatex provided excellent results with a high fibre volume fraction achievable.

As discussed earlier, the binder is chosen to be stable to a temperature greater than the curing temperature. In the examples using Phenodur 1946 and heating to 200° C. the tests indicate that the binder material is beginning to decompose at this temperature. However, curing at 180° C. is satisfactory and does not decompose the binder material.

It can be seen that the binder selected can contribute to the characteristics of the final product and thus selection of the binder enables the characteristics of the product to be tailored in terms of handling and stiffness.

It can be seen from the examples that, inter alia, particularly good results can be obtained for products where any one of the following embodiments are used:
- dropping the starting material a distance onto the substrate plus applying a vacuum force to the fibres on the substrate;
- passing the starting material over the substrate from a plurality of outlet points plus applying a vacuum force to the fibres on the substrate;
- supplying the starting material to the substrate at a pressure plus applying a vacuum force to the fibres on the substrate.

The invention claimed is:

1. A stochastic fibre preform, comprising a non woven substrate of fibres having a stochastic three dimensional matrix, wherein the preform has fibres arranged in the x, y and z directions, and these fibres are randomly oriented, and wherein the fibres are held together in the matrix formation by a cured binder and wherein the fibres comprise carbon fibres, and wherein the preform has a fibre volume fraction of 20% or higher.

2. A fibre preform according to claim 1 wherein 10 wt % or more of the fibres are carbon fibre.

3. A fibre preform according to claim 1 wherein the fibre preform is a fibre matrix obtainable by a method comprising the steps of:
a) providing a starting material which comprises liquid carrier, fibres and binder;
b) passing the starting material over a substrate so as to deposit fibres onto the substrate;
c) forming a three dimensional fibre matrix; and
d) curing the binder.

4. A fibre preform according to claim 3 wherein step d) comprises curing the binder by the application of heat whilst applying a pressure of 5 kPa or more.

5. A fibre preform according to claim 4 wherein step d) comprises curing the binder by the application of heat whilst applying a pressure of 50 kPa to 50000 kPa or more.

6. A fibre preform according to claim 5 wherein step d) comprises curing the binder by the application of heat whilst applying a pressure of such as from 100 kPa to 25000 kPa or more.

7. A fibre preform according to claim 4 wherein in step d) the pressure is applied to the fibrous matrix while the matrix contains moisture.

8. A fibre preform according to claim 1 in which the fibres are arranged in x, y and z directions and from 5 to 30 wt % of the fibres are arranged substantially in the z direction.

9. A fibre preform according to claim 1 wherein the preform is a monolithic structure.

10. A fibre preform according to claim 1 wherein the percentage of binder in the product is from 5% to 60% of the weight of the dried fibrous matrix.

11. A fibre preform according to claim 10 wherein the percentage of binder in the product is from 5% to 30% of the weight of the dried fibrous matrix.

12. A fibre preform according to claim 11 wherein the percentage of binder in the product is from 5% to 20% of the weight of the dried fibrous matrix.

13. A fibre preform according to claim 1 wherein the binder is selected from the group consisting of: epoxy novolac binders, urethanes, acrylics, methacrylates, styrenes, polyurethane co polymers, phenols, poly vinyl imides, poly vinyl alcohols, vinyl acetate/vinyl chloride copolymers, polyamides, PVC, PVDC, polyvinyl sulphones, PEEK (poly ether ketone) materials, polyesters, polyhydroxyether and epoxy materials, castor based hydroxy functional polyols, organic binders, silane binders, acrylic latex binders, highly carbonisable imide binders, and polyvinylpyrrilidone binders.

14. A fibre preform according to claim 13 wherein the binder is selected from the group consisting of: epoxy novolac binders, phenols, poly vinyl imides, poly vinyl alcohols, vinyl acetate/vinyl chloride copolymers, PEEK (poly ether ether ketone) materials, polyhydroxyether and epoxy materials, castor based hydroxy functional polyols, acrylic latex binders, highly carbonisable imide binders, and polyvinylpyrrilidone binders.

15. A fibre preform according to claim 1 in which the preform contains 20% or more of voids by volume.

16. A fibre preform according to claim 15 in which the preform contains 20% to 75% of voids by volume.

17. A fibre preform according to claim 1 wherein the preform has a fibre volume fraction of from 20% to 40%.

18. A carbon-composite product that comprises a fibre preform as defined in claim 1.

19. A laminated fibre preform which comprises at least one layer of a fibre preform as defined in claim 1 and one or more layers of aramid fibres.

20. An article for use in high temperature applications comprising a preform as defined in claim 1.

21. The article of claim 20, which is an article for use in brakes or rocket motor housings.

22. The article of claim 21, wherein the article is a brake shoe lining.

23. A method of producing an article for use in high temperature applications, the method comprising the steps of:
   (i) providing a preform as defined in claim 1; and
   (ii) carrying out a CVD or CVI process on the preform.

24. A method of making a fibre matrix, comprising the steps of:
   a) providing a starting material which comprises liquid carrier, fibres and binder;
   b) passing the starting material over a substrate so as to deposit fibres onto the substrate;
   c) forming a three dimensional fibre matrix as defined in claim 1; and
   d) curing the binder.

* * * * *